United States Patent
Ketner

(10) Patent No.: US 11,975,330 B2
(45) Date of Patent: May 7, 2024

(54) DEVICES FOR HANDLING LABORATORY PLATES AND METHODS OF USING THE SAME

(71) Applicant: MYRIAD WOMEN'S HEALTH, INC., South San Francisco, CA (US)

(72) Inventor: Clayton Salinger Ketner, San Mateo, CA (US)

(73) Assignee: Myriad Women's Health, Inc., South San Francisco, CA (US)

( * ) Notice: Subject to any disclaimer, the term of this patent is extended or adjusted under 35 U.S.C. 154(b) by 507 days.

(21) Appl. No.: 15/852,072

(22) Filed: Dec. 22, 2017

(65) Prior Publication Data

US 2018/0214880 A1 Aug. 2, 2018

Related U.S. Application Data

(60) Provisional application No. 62/472,545, filed on Mar. 16, 2017, provisional application No. 62/452,964, filed on Jan. 31, 2017.

(51) Int. Cl.
*B01L 9/00* (2006.01)
*G01N 35/00* (2006.01)
*G01N 35/04* (2006.01)

(52) U.S. Cl.
CPC .......... *B01L 9/50* (2013.01); *G01N 35/00029* (2013.01); *G01N 35/0099* (2013.01); *B01L 2200/025* (2013.01); *B01L 2200/18* (2013.01); *B01L 2300/0627* (2013.01); *B01L 2300/0829* (2013.01); *G01N 2035/00039* (2013.01);

(Continued)

(58) Field of Classification Search
CPC ............... B01L 9/50; B01L 2300/0829; B01L 2300/0627; B01L 2200/025; B01L 2200/18; G01N 35/0099; G01N 35/00029; G01N 2035/0418; G01N 2035/042; G01N 2035/00039; B25J 9/00
See application file for complete search history.

(56) References Cited

U.S. PATENT DOCUMENTS 3,948,552 A 4/1976 Hamrick
4,667,998 A 5/1987 Borcea et al.
(Continued)

FOREIGN PATENT DOCUMENTS

JP 2013193155 A * 9/2013
WO 2017185012 A1 10/2017

OTHER PUBLICATIONS

Singer Instruments, "High-Throughput Screening: Rotor HDA," located at www.singerinstruments.com/solutions/rotor-hda/, retrieved on Mar. 2, 2017, 12 pages.
(Continued)

*Primary Examiner* — Benjamin R Whatley
*Assistant Examiner* — Curtis A Thompson
(74) *Attorney, Agent, or Firm* — Foley & Lardner LLP

(57) ABSTRACT

A device for handling laboratory plates comprising a base platform and opposing gripping members including one or more gripping members each pivotally attached to a first side of the base platform and one or more gripping members each pivotally attached to a second side of the base platform, wherein said gripping members extend down from the base platform and include a gripping tip disposed at the end of the gripping member, and methods of using the same.

22 Claims, 16 Drawing Sheets

(52) U.S. Cl.
CPC ............... *G01N 2035/0418* (2013.01); *G01N 2035/042* (2013.01)

(56) References Cited

U.S. PATENT DOCUMENTS

| | | | |
|---|---|---|---|
| 4,715,637 A * | 12/1987 | Hosoda | B25J 9/1085 294/106 |
| 4,770,456 A | 9/1988 | Phillips et al. | |
| 4,830,565 A | 5/1989 | Bucher et al. | |
| 5,253,911 A | 10/1993 | Egan et al. | |
| 5,443,791 A | 8/1995 | Cathcart et al. | |
| 5,647,137 A | 7/1997 | McMurtry et al. | |
| 5,856,176 A | 1/1999 | Mathus et al. | |
| 5,968,731 A | 10/1999 | Layne et al. | |
| 6,060,022 A | 5/2000 | Pang et al. | |
| 6,360,792 B1 * | 3/2002 | Ganz | B01L 3/0293 141/129 |
| 6,534,014 B1 * | 3/2003 | Mainquist | B01L 3/50853 422/551 |
| 6,586,255 B1 | 7/2003 | Hubert et al. | |
| 6,998,064 B2 * | 2/2006 | Gadow | C04B 38/0615 264/650 |
| 7,141,213 B1 | 11/2006 | Pang et al. | |
| 7,207,434 B2 | 4/2007 | Hartness et al. | |
| 7,216,758 B2 | 5/2007 | Hartness et al. | |
| 10,011,019 B1 * | 7/2018 | Strauss | B25J 15/022 |
| 2003/0044991 A1 * | 3/2003 | Haslam | G01N 35/04 422/65 |
| 2003/0096427 A1 | 5/2003 | Hall | |
| 2005/0158212 A1 | 7/2005 | Yavilevich | |
| 2007/0095024 A1 | 5/2007 | Neeper et al. | |
| 2009/0289591 A1 * | 11/2009 | Kassow | B25J 18/00 318/568.13 |
| 2010/0248995 A1 * | 9/2010 | Kensy | B01F 31/22 506/39 |
| 2011/0306097 A1 | 12/2011 | Belz et al. | |
| 2012/0094388 A1 * | 4/2012 | Belz | B01L 9/523 436/47 |
| 2012/0321516 A1 * | 12/2012 | Schacher | G01N 35/04 53/381.1 |
| 2013/0001970 A1 * | 1/2013 | Suyama | B25J 15/0052 294/213 |
| 2013/0068527 A1 | 3/2013 | Parness | |
| 2013/0183129 A1 * | 7/2013 | Nammoto | B25J 9/00 901/31 |
| 2014/0045210 A1 * | 2/2014 | Menges | G01N 21/6428 422/82.08 |
| 2014/0196366 A1 * | 7/2014 | Teasdale | A01G 9/086 414/226.01 |
| 2015/0066199 A1 * | 3/2015 | Shimono | B25J 9/1687 700/218 |
| 2016/0023213 A1 * | 1/2016 | Richardson | G01N 35/109 414/589 |

OTHER PUBLICATIONS

PCT Search Report and Written Opinion dated May 16, 2018 for PCT Application No. PCT/US2017/068096.

\* cited by examiner

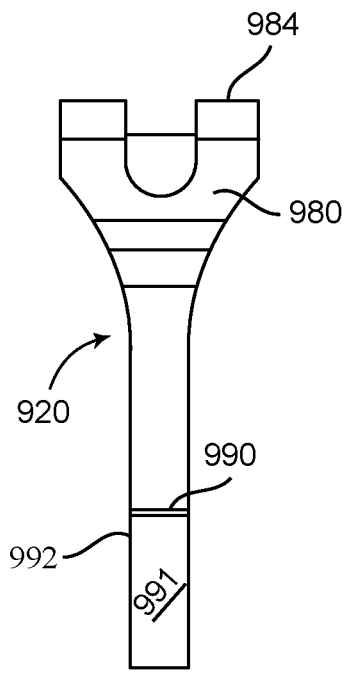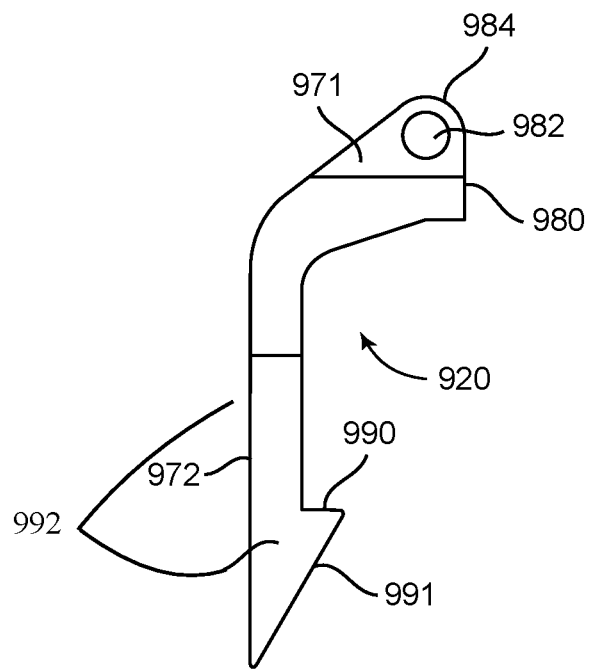
FIG. 17  FIG. 18
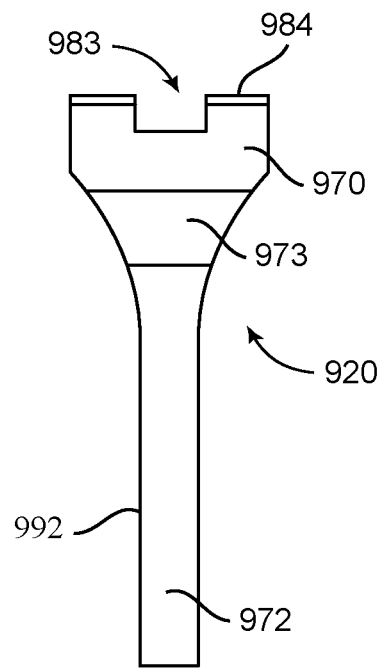
FIG. 19

DEVICES FOR HANDLING LABORATORY PLATES AND METHODS OF USING THE SAME

RELATED APPLICATIONS

This application claims priority to U.S. Provisional Application Nos. 62/452,964, filed Jan. 31, 2017, entitled Device for Removing Plate Lids for Use in an Automatic Diagnostic Laboratory, and 62/472,545, filed Mar. 16, 2017, entitled Automatic Diagnostic Laboratory and Laboratory Information Management System for High Throughput and Device for Removing Microplate Lids and Methods of Using the Same, each hereby incorporated by reference.

FIELD OF THE INVENTION

The invention relates generally to an automatic diagnostic laboratory for high throughput processes and management of processes in a laboratory environment and to devices for removing the lids from microplates and methods of using the same.

BACKGROUND OF THE INVENTION

A laboratory information management system (LIMS), also referred to as a laboratory management system (LMS) or a laboratory information system (LIS), is a system for modernizing functions within a laboratory that have traditionally been performed manually or semi-manually. A LIMS system may include but is not limited to a server or host computer, database, management software, and may be coupled to associated laboratory instrumentation for performing respective laboratory functions. A LIMS system will generally assist laboratory personnel in tracking, analyzing, sorting, and routing laboratory samples throughout complex laboratory processes in an efficient and cost-effective manner.

Advantages of LIMS systems include, but are not limited to, enhanced sample management, quality control, chain of custody, and report generation. A LIMS system also permits flexible control of access to laboratory information among a diverse user set, such as physicians, patients, analysts, and technicians. However, due to the rapidly changing pace of laboratory infrastructure and the diversity of laboratory techniques, there exists a need for a highly configurable and adaptable LIMS system to increase the lifespan of laboratory equipment and reduce the occurrence of equipment upgrades. Therefore, a method and system for an automatic diagnostic laboratory for high throughput is provided.

BRIEF SUMMARY OF THE INVENTION

One aspect of the invention relates to an automated diagnostic laboratory and laboratory management system for high throughout and methods of using the same, including subsystems and components for use with the same.

Another aspect of the invention relates to devices for removing the lid from a microplate or similar laboratory plates.

One embodiment relates to a device for handling laboratory plates comprising:
 a. a base platform having (i) a length extending along a first direction and a width perpendicular to the length, (ii) a first side along the first direction and a second side along the first direction and opposite the first side, (iii) a front side across the first direction and an opposite back side across the first direction, (iv) a top surface, and (v) a bottom surface; and
 b. at least one pair of opposing gripping members including one or more gripping members pivotally attached to the first side and one or more gripping members pivotally attached to the second side, wherein the gripping members extend down from the base and include a gripping tip disposed at the end of the gripping member.

The invention also relates to systems containing the devices described herein and methods of using the same.

BRIEF DESCRIPTION OF THE DRAWINGS

FIG. 17 a rear schematic view of the gripping member of FIG. 15.

FIG. 18 a side schematic view of the gripping member of FIG. 15.

FIG. 19 a front schematic view of the gripping member of FIG. 15.

DETAILED DESCRIPTION OF THE INVENTION

In general, the invention provides for automation and laboratory information management, and may be embodied as a system, method, or computer program product. Furthermore, another aspect of the present invention may take the form of an entirely software embodiment, entirely hardware embodiment, or a combination of software and hardware embodiments. Even further, another aspect of the present invention may take the form of a computer program product contained on a computer-readable storage medium, where computer-readable code is embodied on the storage medium. In another embodiment, another aspect of the present invention may take the form of computer software implemented as a service (SaaS). Any appropriate storage medium may be utilized, such as optical storage, magnetic storage, hard disks, or CD-ROMs. A still further aspect of the invention relates to devices adapted or configured for processing microplates during laboratory or manufacturing processes and methods of using the same.

Figure 1:
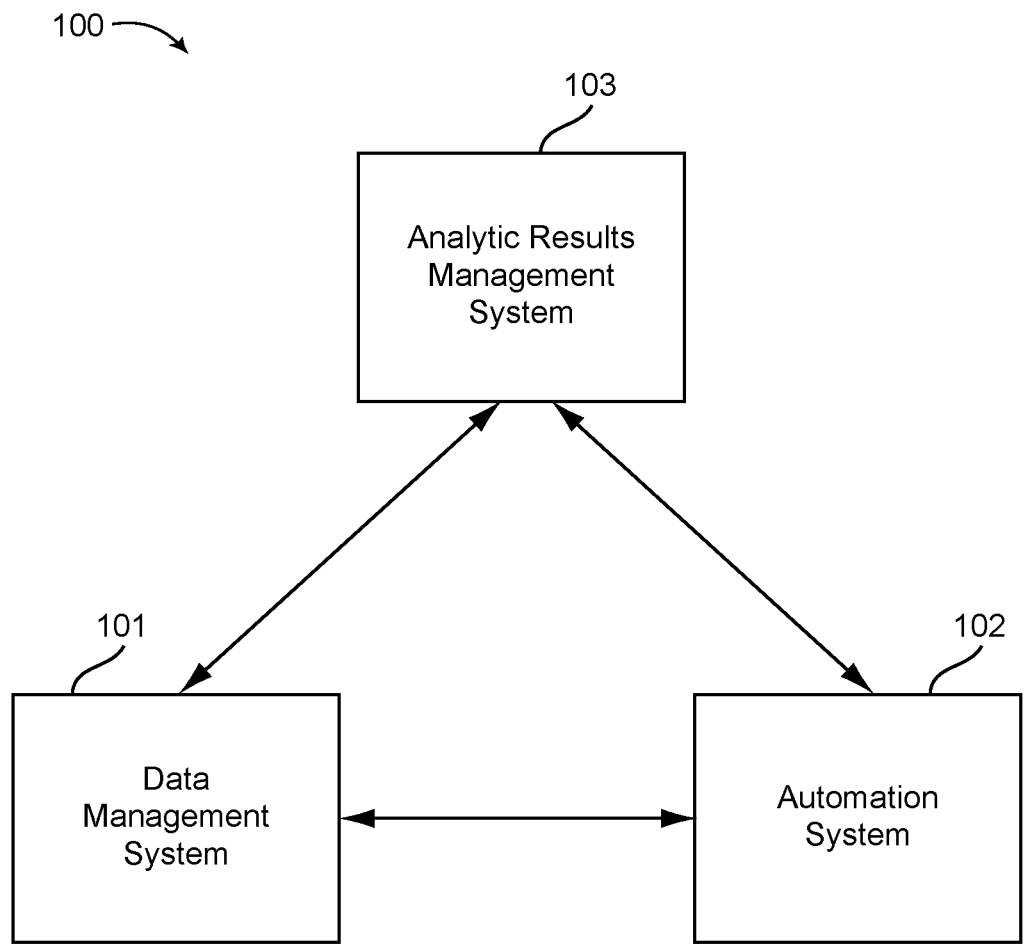
FIG. 1 is a block diagram that depicts an automatic diagnostic laboratory and a laboratory information management system.

FIG. 1 illustrates an overview of system 100 for an automatic diagnostic laboratory and laboratory information management system (hereinafter "LIMS"). System 100 includes a data management system 101, automation system 102, and analytics results management system (ARMS) 103. In general, data management system 101 is a centralized database tool for maintaining information pertaining to the LIMS system, such as maintaining laboratory tests, diagnostics, equipment, personnel, and the like. In one embodiment, data management system 101 is dynamically updated and facilitates the management of information among other components of the LIMS system, such as automation system 102 and ARMS 103.

Automation system 102 generally provides for the management of laboratory workflow, and may permit one or more users to create and deploy custom laboratory workflow processes. For example, automation system 102 may provide functionality for a user to create a graphical diagram to model different laboratory equipment and diagnostics, and may permit the user to customize the timing, decision-making, and other test variables of laboratory analytics. Automation system 102 may further provide functionality to permit a user to deploy one or more workflow processes based on user-generated diagrams, and such workflow processes may be modified dynamically by the user. Furthermore, automation system 102 may include hardware and software components for interfacing with laboratory equipment, such as robotics units, conveyor systems, sample repositories, climate control systems, (e.g., lighting and temperature), pneumatic systems, audio/video systems, etc.

In one embodiment, automation system 102 may include hardware and/or software for enabling one or more robotics units to perform movements related to testing laboratory samples, such as mixing, shaking, heating, cooling, picking, and/or placing or samples. For example, automation system 102 may generate and send commands to the one or more robotics units to allow the robotics units to move in three-dimensional space. Such commands may also permit the one or more robotics units to interface with a pneumatics system to utilize pressurized air for grasping and releasing one or more samples. In one embodiment, the samples may be contained in a test tube, vial, or similar container. Automation system 102 may further be configured to generate and send commands to the one or more robotics units to allow the robotics units to remove and/or replace a lid on the top of a container. For example, the one or more robotics units may be equipped with machinery capable of sensing a test tube lid, and further capable of removing the test tube lid by one or more robotic motions. Similarly, the one or more robotics units may be equipped with machinery to sense a test tube without a lid, and may perform one or more robotic motions to place and seal the test tube with a lid, for example.

ARMS 103 generally provides a system for dynamically rendering and organizing laboratory information, including but not limited to information such as diagnostic results, quality control metrics, historical test data, sample genotypes, and the like. For example, ARMS 103 may facilitate the generation of interactive data visualizations to permit one or more users to effectively oversee laboratory chemistry, algorithms, and products. ARMS 103 may also permit one or more users to perform complex analytical functions, such as analyze and manipulate quality control constraints, synthesize raw test data, and manually correct test results.

In one embodiment, one or more components of the data management system 101, automation system 102, and/or ARMS 103 may be maintained at a location local to the laboratory and associated equipment (e.g., a server room). In another embodiment, one or more components of the data management system 101, automation system 102, and/or ARMS 103 may be maintained at a location remote from the laboratory and associated equipment (e.g., a "cloud-based" system). In yet another embodiment, one or more components of the data management system 101, automation system 102, and/or ARMS 103 may be maintained in a combination of local and remote locations.

Figure 2:
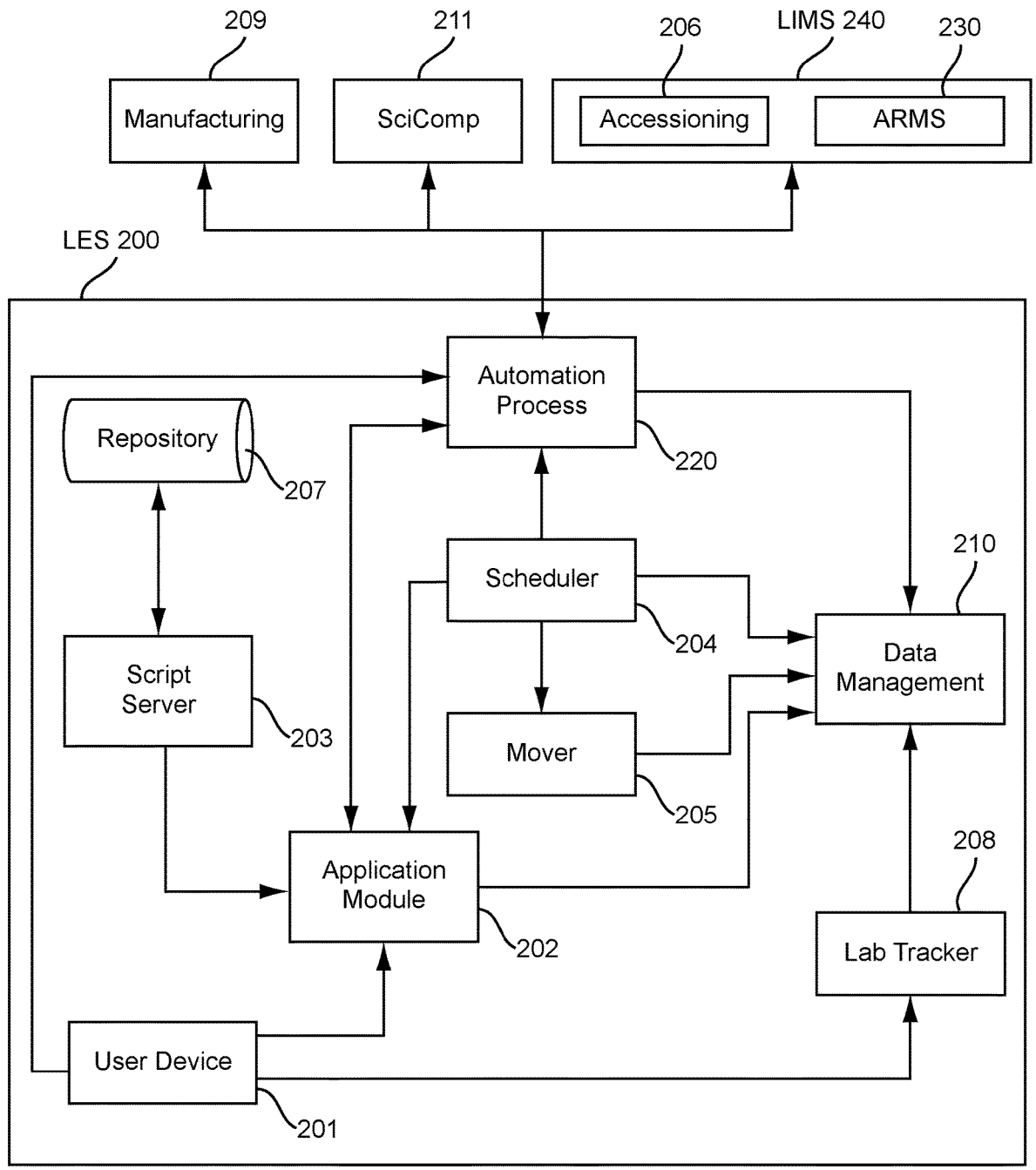
FIG. 2 is a block diagram that depicts a detailed view of a laboratory execution system for facilitating laboratory automation.

FIG. 2 illustrates a detailed view of a laboratory execution system (LES) 200. LES 200 may include a data management tool 210 and an automation process 220. Furthermore, LES 200 may communicate with a LIMS module 240. In one embodiment, LIMS module 240 may include at least an accessioning module 206 and an analytic results management system (ARMS) 230, which are discussed in more detail with respect to FIG. 3. FIG. 2 further depicts user device 201 and application module 202, which will now be described. User device 201 may permit a user to interact with LES 200 and thus facilitate user interaction with each of the data management tool 210, automation process 220, and ARMS 230, and/or other associated systems. User device 201 may communicate with application module 202 in order to perform one or more functions as described herein.

In one embodiment, application module 202 may be an application programming interface (API) for performing one or more automated functions. In another embodiment, application module 202 may be a graphical user interface (GUI), whereby a user may instruct LES 200 to perform one or more functions such as loading a script, running a diagnostic method, executing a laboratory instrument action, or the like. User device 201 may also interface with LES 200 by direct interaction with other components of the system. For example, user 201 may provide a command directly to scheduler 204 for fixing execution time errors.

In another embodiment, lab tracker 208 facilitates physical location management of one or more robotics units. For example, lab tracker 208 may be configured as a database which stores positional information of all physical objects for a given point in time. Lab tracker 208 may also receive information from other components in LES 200. For example, user 201 may provide a command to lab tracker module 208 for fixing a plate tracking error.

FIG. 2 further depicts automation process 220, which may provide workflow management of sample plates, samples, and associated data. For example, automation process 220 may provide information regarding available plates to application module 202, or may otherwise indicate the availability of system resources to application module 202. As another example, automation process 220 may receive reporting information, such as a job completion report, from application module 202. Automation process 220 may also receive seed pipeline information, which may be manually entered by a user and provided directly to the automation process 220 from user device 201. Seed pipeline information may include, for example, information to instantiate new objects for management into the LIMS system. For example, a user may utilize a GUI in order to create research samples, where the research samples are introduced as seed pipeline information into automation process 220.

In another embodiment, automation process 220 may receive seed pipeline information from an accessioning module 206. In yet another embodiment, automation process 220 may receive query information from ARMS 230, for example, a query regarding results to be displayed. Automation process 220 may further receive query information from scheduler 204, for example, a query regarding a pending job. Furthermore, automation process 220 may provide data management tool 210 with data validation information and information regarding data queries.

Furthermore, FIG. 2 shows data management tool 210, which will now be described. Data management tool 210 may be configured to integrate quantitative data, track sample barcodes, and manage overall workflow of LES 200. In one embodiment, data management tool 210 may receive information regarding a report operation from application module 202. In another embodiment, data management tool 210 may receive a report operation from mover module 205. Furthermore, data management tool 210 may receive a command to fix plate tracking errors from a user via lab tracker module 207. In yet another embodiment, data management tool 210 may receive, from scheduler 204, a query regarding stateful data. In one example, such a query pertains to seal, spin, or location information.

FIG. 2 further depicts script server 203 and repository 207, which will now be described. In one embodiment, script server 203 may communicate with a version control system (VCS) repository 207 in order to obtain one or more software scripts for use in operating LES 200. VCS repository 207 may be maintained by known repositories such as "Github," or any other appropriate VCS repository service, as will be appreciated by one of ordinary skill in the art. In one embodiment, script server 203 may obtain software scripts from VCS repository 207, and may further push one or more software scripts to application module 202. Script server 203 may be further configured to deploy scripts and manage script metadata.

Scheduler 204 may be configured to automate scheduling and execute applications. For example, scheduler 204 may include at least one software module such as script compiler, scheduler, and/or executor. In one embodiment, scheduler 204 may provide application module 202 with one or more commands for performing an action, or may further provide application module 202 with a query for an API function. In another embodiment, scheduler 204 may be configured to initiate and/or deliver one or more queries for an API function, and may be further configured to initiate and/or deliver one or more queries regarding stateful data. In another embodiment, scheduler 204 may be configured to initiate and/or deliver one or more queries regarding a pending job. In yet another embodiment, scheduler 204 may be configured to receive a command to fix execution time errors.

Mover application 205 may be configured to communicate with one or more robotics units within a laboratory environment. For example, mover application 205 may facilitate the directing of the one or more robotics units to perform one or more movements in three-dimensional space. Mover application 205 may send instructions to the one or more robotics units regarding a movement, path, direction, or other information relating to three-dimensional space in which the one or more robotics units may perform any number of movements. In another embodiment, scheduler 204 may provide mover module 205 with one or more commands for performing a move, such as, for example, robotic movements described in detail with respect to FIG. 6.

Additionally, LES 200 may be configured to communicate with manufacturing module 209. In one embodiment, manufacturing module 209 is configured to provide LES 200 with information related to sample components, such as plastic, reagents, and the like. For example, manufacturing module 209 may assist in identifying sample components which are introduced into LES 200. In another embodiment, manufacturing module 209 may be configured to declare and generate barcode labels for one or more sample plates and sample tubes.

LES 200 may further communicate with SciComp module 211. In one embodiment, SciComp module 211 may facilitate overall automation within the LIMS system by managing the processing of all main stages, including but not limited to (i) physical sample acquisition, (ii) sequencing, (iii) raw data generation, (iv) data analysis, and (v) transfer of analyzed data to ARMS. In one example, SciComp module 211 may assist automation process 220 by querying automation process 200 for information pertaining to a next job to process. SciComp module 322 may further include components such a script server and/or scheduler for maintaining efficient job workflow. In one embodiment, SciComp module 211 may perform the necessary data analytics tasks of the LIMS system, and may run the necessary algorithms to automatically produce patient variant calls from raw data to analyzed data.

Although only one instance of each module is listed on FIG. 2 (e.g. one scheduler 204 and one mover 205), LES 200 may include one or more instances of any such module. For example, there may be two or more instances of scheduler 204, which are each associated with a specific process or device within the laboratory environment.

Figure 3:
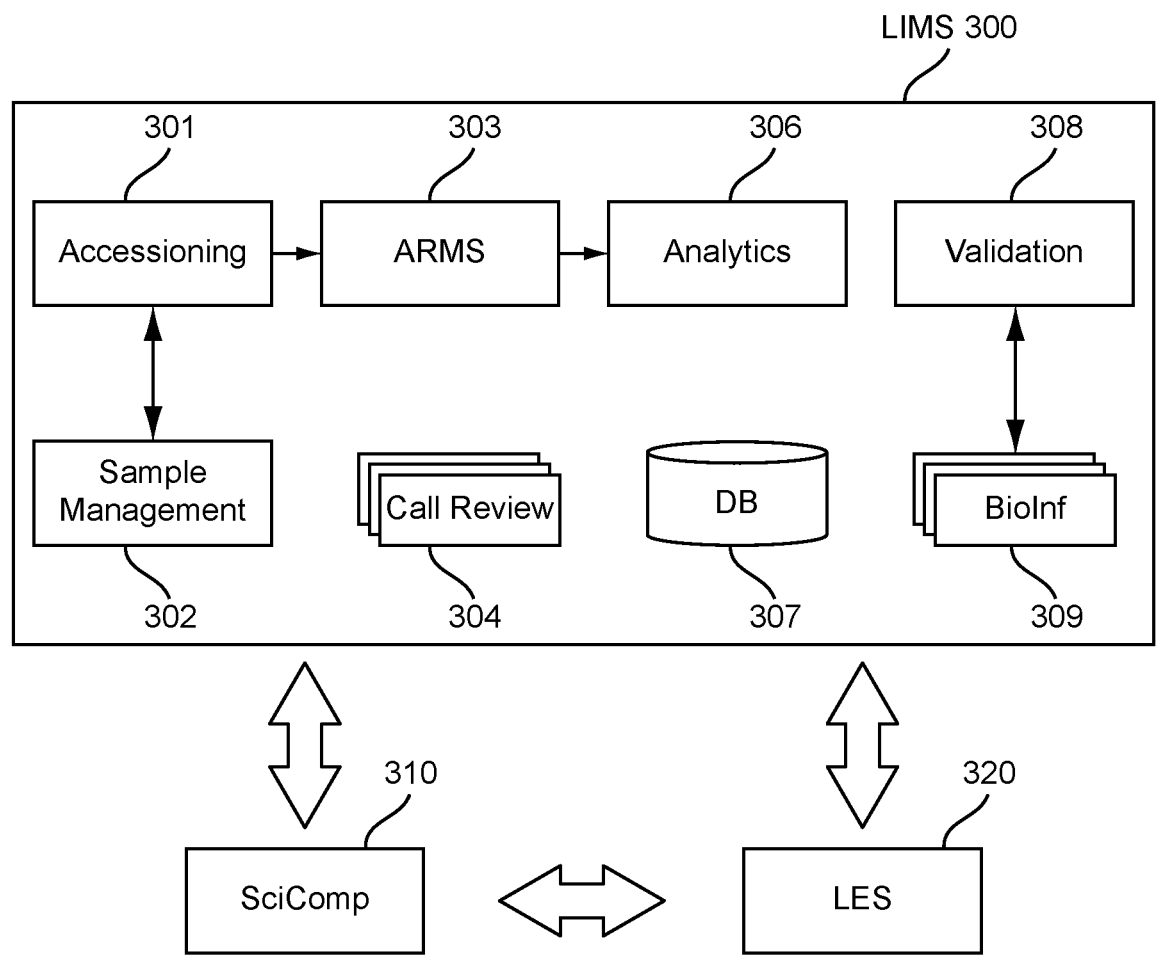
FIG. 3 is a block diagram that depicts a detailed view of a laboratory information management system for facilitating laboratory automation.

FIG. 3 illustrates a detailed depiction of laboratory information management system (LIMS) 300. In one embodiment, LIMS 300 includes an accessioning module 301 and sample management module 302. Accessioning module 301 may be configured to record the arrival of a sample and instantiate the arrival of the sample within one or more databases. For example, accessioning module 301 may be configured to send a first set of information to ARMS 303. The first set of information may include, for example, information pertaining to a disease panel order. Sample management module 302 may be configured to communicate with accessioning module 301 in the organization of one or more samples to be seeded to ARMS 303. Analytics module 306 may receive one or more outputs from ARMS 303, such as results pertaining to a disease panel order. LIMS 300 may further include validation module 308 and bioinformation module 309. Validation module 308 and bioinformation module 309 may each be configured to assist in the development of sample assays for testing.

As depicted in FIG. 3, LIMS 300 may further communicate with LES 310 and SciComp 320, as discussed with respect to FIG. 2. LIMS 300 may further include a call review module 304, which may be configured to provide processing techniques to review and modify variant call processing data. LIMS 300 may further include a database module 307 to store information relating to samples and associated test data, as used within LIMS 300.

ARMS 303 may be further configured as a database containing genotypes for samples. For example, ARMS 303 may be configured to process, maintain, and deliver information regarding genotyping data based on one or more Variant Call Format (VCF) files. As will be appreciated by one of ordinary skill in the art, a VCF file is a standardized text file format for representing and storing gene sequence variations. In one embodiment, ARMS 303 may provide a results query to an automation process on LES 320. For example, a results query may be utilized to determine which results are capable of being displayed.

In another embodiment, ARMS 303 includes functionality for generating a GUI, where the GUI provides a user with real-time data corresponding to laboratory diagnostics and analysis for one or more samples. The GUI may permit the user to perform a plurality of functions, including but not limited to quality control (QC) monitoring and adjustment, sample history generation, manual tagging of samples, and the ability to manually pass or fail a given sample. ARMS 303 may include functionality for generating custom diagnostics reports, including the generation of graphs, tables, spreadsheets, plots, diagrams, and/or other visualization to enable efficient data interpretation.

Figure 4:
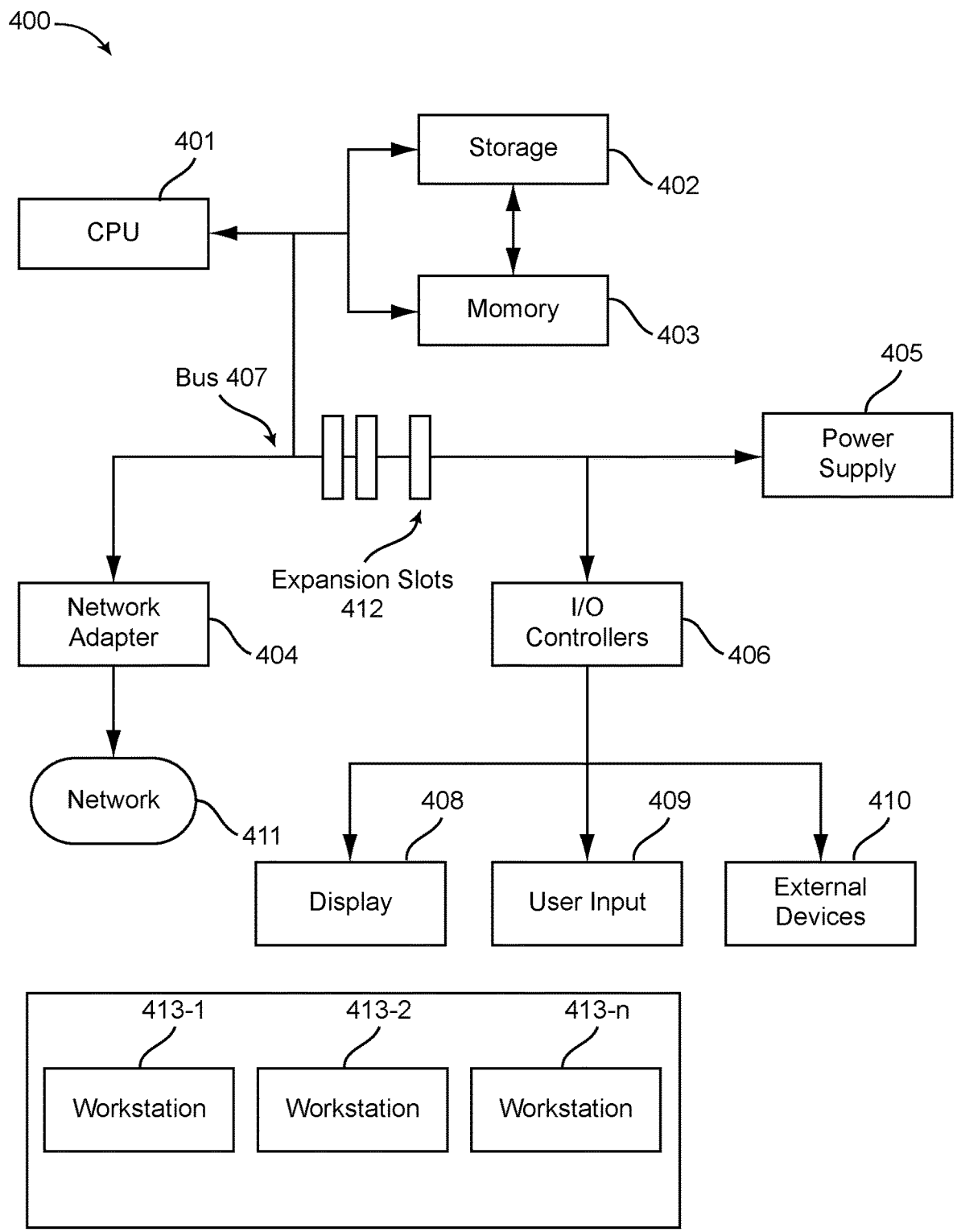
FIG. 4 is a block diagram that depicts a general computing system in which one or more systems may be implemented.

FIG. 4 illustrates a general purpose computing system 400 in which one or more systems, as described herein, may be implemented. System 400 may include, but is not limited to known components such as central processing unit (CPU) 401, storage 402, memory 403, network adapter 404, power supply 405, input/output (I/O) controllers 406, electrical bus 407, one or more displays 408, one or more user input devices 409, and other external devices 410. It will be understood by those skilled in the art that system 400 may contain other well-known components which may be added, for example, via expansion slots 412, or by any other method known to those skilled in the art. Such components may include, but are not limited, to hardware redundancy components (e.g., dual power supplies or data backup units), cooling components (e.g., fans or water-based cooling systems), additional memory and processing hardware, and the like.

System 400 may be, for example, in the form of a client-server computer capable of connecting to and/or facilitating the operation of a plurality of workstations or similar computer systems over a network. In another embodiment, system 400 may connect to one or more workstations over a intranet or internet network, and thus facilitate communication with a larger number of workstations or similar computer systems. Even further, system 400 may include, for example, a main workstation or main general purpose computer to permit a user to interact directly with a central server. Alternatively, the user may interact with system 400 via one or more remote or local workstations 413. As will be appreciated by one of ordinary skill in the art, there may be any practical number of remote workstations for communicating with system 400.

CPU 401 may include one or more processors, for example Intel® Core™ i7 processors, AMD FX™ Series processors, or other processors as will be understood by those skilled in the art. CPU 401 may further communicate with an operating system, such as Windows NT® operating system by Microsoft Corporation, Linux operating system, or a Unix-like operating system. However, one of ordinary skill in the art will appreciate that similar operating systems may also be utilized. Storage 402 may include one or more types of storage, as is known to one of ordinary skill in the art, such as a hard disk drive (HDD), solid state drive (SSD), hybrid drives, and the like. In one example, storage 402 is utilized to persistently retain data for long-term storage. Memory 403 may include one or more types memory as is known to one of ordinary skill in the art, such as random access memory (RAM), read-only memory (ROM), hard disk or tape, optical memory, or removable hard disk drive. Memory 403 may be utilized for short-term memory access, such as, for example, loading software applications or handling temporary system processes.

As will be appreciated by one of ordinary skill in the art, storage 402 and/or memory 403 may store one or more computer software programs. Such computer software programs may include logic, code, and/or other instructions to enable processor 401 to perform the tasks, operations, and other functions as described herein, and additional tasks and functions as would be appreciated by one of ordinary skill in the art. Operating system 402 may further function in cooperation with firmware, as is well known in the art, to enable processor 401 to coordinate and execute various functions and computer software programs as described herein. Such firmware may reside within storage 402 and/or memory 403.

Moreover, I/O controllers 406 may include one or more devices for receiving, transmitting, processing, and/or interpreting information from an external source, as is known by one of ordinary skill in the art. In one embodiment, I/O controllers 406 may include functionality to facilitate connection to one or more user devices 409, such as one or more keyboards, mice, microphones, trackpads, touchpads, or the like. For example, I/O controllers 406 may include a serial bus controller, universal serial bus (USB) controller, Fire-Wire controller, and the like, for connection to any appropriate user device. I/O controllers 406 may also permit communication with one or more wireless devices via technology such as, for example, near-field communication (NFC) or Bluetooth™. In one embodiment, I/O controllers 406 may include circuitry or other functionality for connection to other external devices 410 such as modem cards, network interface cards, sound cards, printing devices, external display devices, or the like. Furthermore, I/O controllers 406 may include controllers for a variety of display devices 408 known to those of ordinary skill in the art. Such display devices may convey information visually to a user or users in the form of pixels, and such pixels may be logically arranged on a display device in order to permit a user to perceive information rendered on the display device. Such display devices may be in the form of a touch-screen device, traditional non-touch screen display device, or any other form of display device as will be appreciated be one of ordinary skill in the art.

Furthermore, CPU 401 may further communicate with I/O controllers 406 for rendering a graphical user interface (GUI) on, for example, one or more display devices 408. In one example, CPU 401 may access storage 402 and/or memory 403 to execute one or more software programs and/or components to allow a user to interact with the system as described herein. In one embodiment, a GUI as described herein includes one or more icons or other graphical elements with which a user may interact and perform various functions. For example, GUI 407 may be displayed on a touch screen display device 408, whereby the user interacts with the GUI via the touch screen by physically contacting the screen with, for example, the user's fingers. As another example, GUI may be displayed on a traditional non-touch display, whereby the user interacts with the GUI via keyboard, mouse, and other conventional I/O components 409. GUI may reside in storage 402 and/or memory 403, at least in part as a set of software instructions, as will be appreciated by one of ordinary skill in the art. Moreover, the GUI is not limited to the methods of interaction as described above, as one of ordinary skill in the art may appreciate any variety of means for interacting with a GUI, such as voice-based or other disability-based methods of interaction with a computing system.

Moreover, network adapter 404 may permit device 400 to communicate with network 411. Network adapter 404 may be a network interface controller, such as a network adapter, network interface card, LAN adapter, or the like. As will be appreciated by one of ordinary skill in the art, network adapter 404 may permit communication with one or more networks 411, such as, for example, a local area network (LAN), metropolitan area network (MAN), wide area network (WAN), cloud network (IAN), or the Internet.

One or more workstations 413 may include, for example, known components such as a CPU, storage, memory, network adapter, power supply, I/O controllers, electrical bus, one or more displays, one or more user input devices, and other external devices. Such components may be the same, similar, or comparable to those described with respect to system 400 above. It will be understood by those skilled in the art that one or more workstations 413 may contain other well-known components, including but not limited to hardware redundancy components, cooling components, additional memory/processing hardware, and the like.

Figure 5:
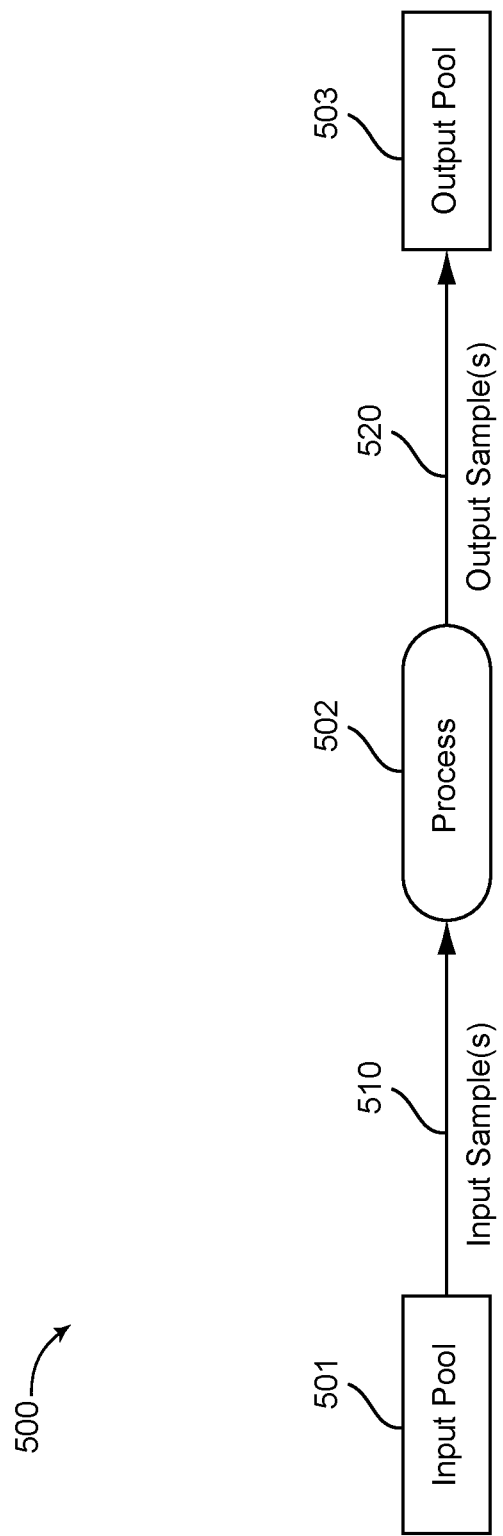
FIG. 5 illustrates an exemplary workflow diagram for sample processing.

FIG. 5 illustrates an exemplary laboratory process 500 facilitated by, for example, automation process 220 in FIG. 2. In one embodiment, automation process 220 provides a user with the ability to create lab workflow processes in order to maintain sample queues for diagnostics and analysis. For example, a user may create one or more graphical objects on a GUI display, where the objects may represent one or more laboratory states, decisions, inputs, outputs, or other conditions to model a laboratory process. A resulting laboratory process may be created based on the one or more graphical objects created by the user, such as, for example, a process as depicted in FIG. 5.

In one embodiment, process 500 includes input pool object 501, which may represent, for example, one or more polymerase chain reaction (PCR) plates. Samples from the input pool may be scheduled to undergo one or more tests, diagnostics, or other laboratory processes 502. For example, samples within the one or more PCR plates may undergo a process for DNA amplification. Arrow 510 may represent the transfer of one PCR plate 501 to amplification process 502, for example. Arrow 520 may represent a successful output of amplification process 502, such as, for example, one amplified PCR plate. Output pool 503 may represent, for example, one or more amplified PCR plates. Arrow 520 may therefore represent the transfer of one amplified PCR plate to output pool object 503. Although only one input, one process, and one output are depicted in process 500, it will be appreciated that any number of inputs, outputs, processes, transfers, or other laboratory functions may be represented by such a graphical diagram, and that the invention is not limited to the exemplary process depicted in FIG. 5.

Figure 6:
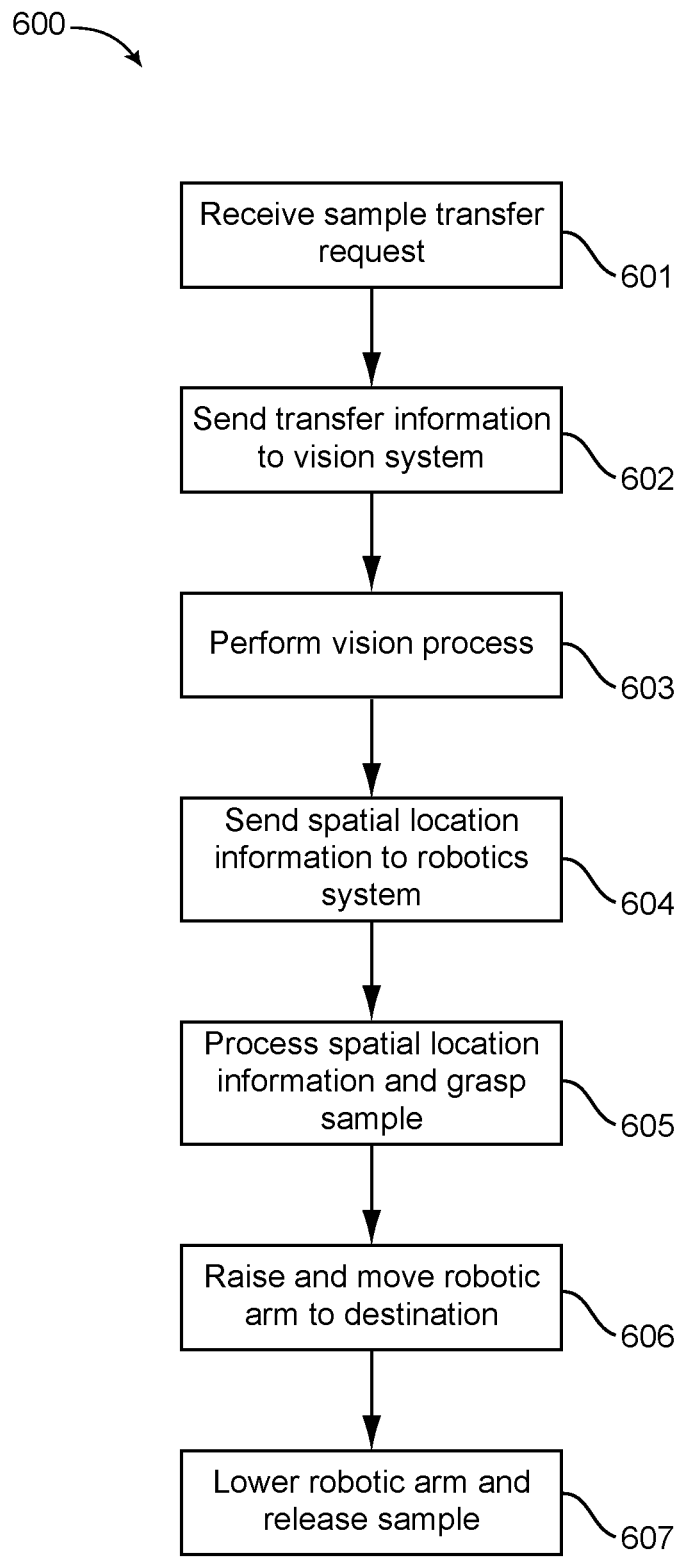
FIG. 6 illustrates an exemplary process diagram for controlling a robotics unit to transport one or more sample tubes.

FIG. 6 illustrates an exemplary transfer process 600 for controlling a robotics unit to transport one or more sample tubes. Transfer process 600 may be facilitated at least in part by automation process 220 as described in FIGS. 1 and 2. For example, automation process 220 may communicate with hardware and software processes associated with one or more robotics, vision, and/or pneumatic systems in order to perform transfer process 600. In one embodiment, transfer process 600 is utilized to transfer at least one sample from an origin location to a destination location by using at least one robotics unit coupled with vision and pneumatics systems.

Transfer process 600 may begin at step 601, where automation process may receive a sample transfer request. Such request may be, for example, a manual request entered by a user, or may be an automated request initiated by a pre-scheduled workflow process. In one embodiment, the request includes information identifying at least one sample barcode corresponding to a current sample, and may further include information identifying a destination location for transferring the sample associated with the sample barcode from an origin location to the destination location.

At step 602, automation process may send transfer information to a vision system in order to identify the spatial location of the identified sample. In one embodiment, the vision system performs a vision matching process at step 603 to identify if a matching barcode exists within the vision system's viewing area. If a matching barcode is found, the vision system may send corresponding spatial location information to robotics system at step 604. Such spatial location information may correspond to sample location information discovered by the vision system when identifying matching barcode in step 603. The spatial location information may be in a form readable by robotics unit in order to permit the robotics unit to identify a three dimensional location in space corresponding to the physical sample identified.

At step 605, the robotics unit may receive and process the spatial location information, and may further grasp the identified sample. For example, the robotics unit may utilize the spatial location information to move a robotic arm to a location corresponding to a position directly above the identified sample. The robotic arm may then be lowered to a location near the sample, and the arm may grasp the sample by utilizing, for example, a pneumatic system. In one example, the sample is contained in a test tube which is grasped by a robotic arm, where a pneumatic system generates a vacuum in order to grip the test tube.

At step 606, the robotic arm may be raised while grasping the sample, and the robotic arm may be moved to a location corresponding to a destination location as received in the sample transfer request. At step 607, the robotic arm may lower the sample onto a location corresponding to the desired location, and may release the sample from the robotic grip by performing one or more pneumatic processes via the pneumatic system. For example, the pneumatic system may release the grip on the sample by discharging the vacuum and briefly expelling air near the sample.

Figure 7:
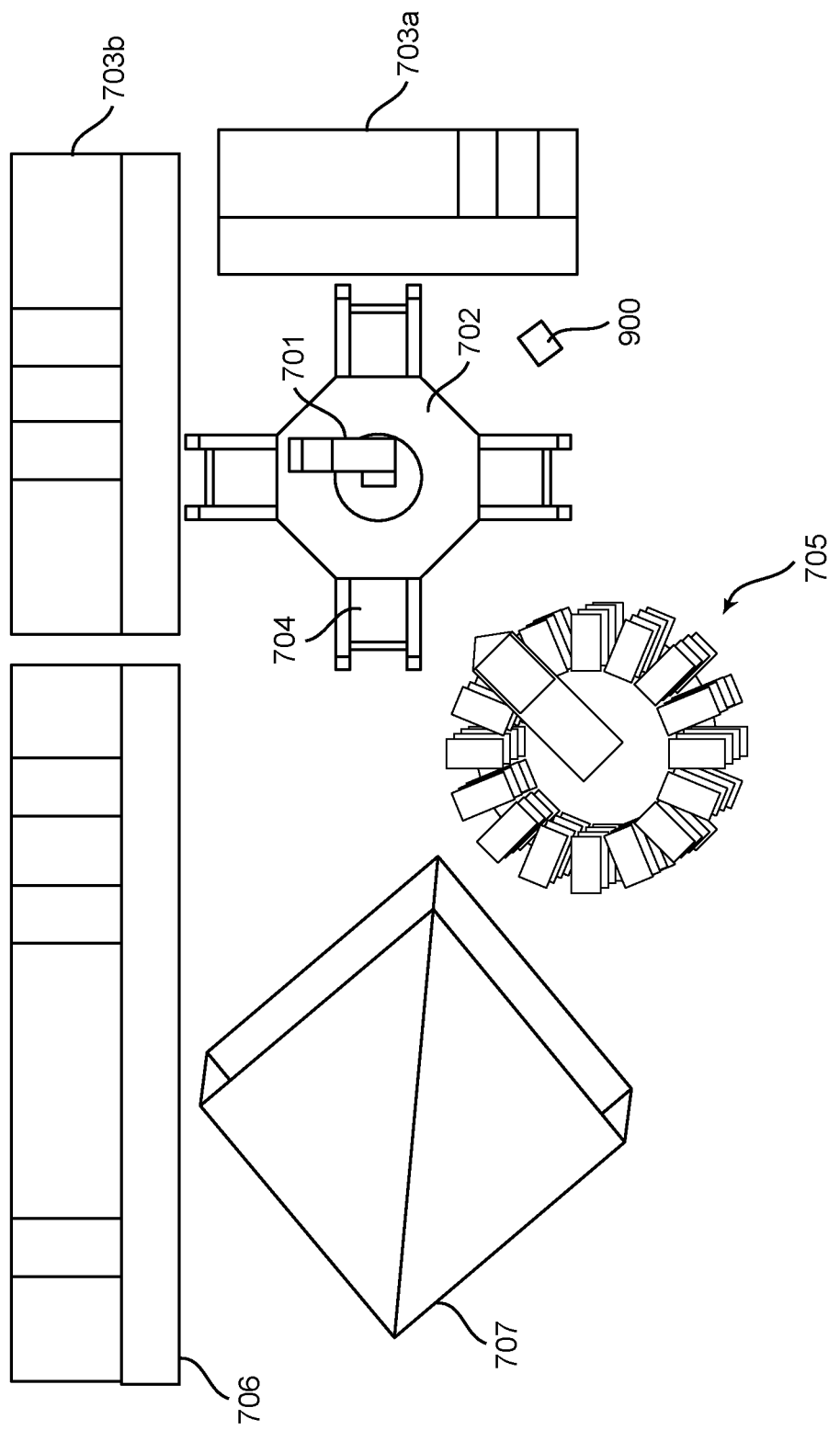
FIG. 7 illustrates a block diagram of a robotic system for managing automatic laboratory processes.

FIG. 7 illustrates a robotic system 700 for managing automatic laboratory processes. In one embodiment, robotic system 700 includes a robotic arm 701 for facilitating the movement of one or more samples. For example, robotic arm 701 may be configured to grasp a test tube containing a sample, and transport the test tube from a first location to a second location. In another example, robotic arm 701 may be configured to grasp a sample rack, and transport the sample rack from a first location to a second location. A sample rack may contain one or more samples, and may be stored, for example, in a sample rack repository 705. In one embodiment, sample rack repository 705 may contain one or more sample racks and may facilitate efficient storage and retrieval of one or more sample racks.

In one embodiment, robotic arm 701 may further be affixed to a robotic arm base 702, and may be configured to rotate in a 360 degree motion about the laboratory environment. For example, robotic arm 701 may extend from a first position, such as the position depicted in FIG. 7, to a second position, such as a position extending into a first liquid handling apparatus 703*a*. Furthermore, robotic arm 701 may, for example, retract from the extended position in first liquid handling apparatus 703*a* and return to the position as depicted in FIG. 7. Furthermore, robotic arm 701 may retract from the position in first liquid handling apparatus 703*a*, and then extend to a position within a second liquid handling apparatus 703*b*. In one embodiment, the robotic arm may perform various movements within liquid handling apparatus 703*a* and liquid handling apparatus 703*b* in order to facilitate various sample test procedures.

In another embodiment, robotic arm 701 may be configured to transport one or more samples and/or sample racks from sample rack repository 705 to liquid handling apparatus 703*a* or liquid handling apparatus 703*b*. Robotic arm 701 may further be configured to return one or more samples and/or sample racks from liquid handling apparatus 703*a* or liquid handling apparatus 703*b* to sample rack repository 705, for example. Furthermore, although only two liquid handling apparatus 703*a* and 703*b* are depicted in FIG. 7, one will appreciate that additional liquid handling apparatus may be deployed within the laboratory environment, and that robotic arm 701 may extend into other such areas within the reach of robotic arm 701.

In yet another embodiment, robotic arm 701 may be surrounded by one or more sensors 704. Sensors 704 may, for example, detect specific motions within an area surrounding robotic arm 701, such as a predefined motion detection area. In one embodiment, the motion detection area may be defined by a spherical or semi-spherical region centered at or near a coupling point of robotic arm 701 to robotic arm base 702. In another embodiment, the motion detection area may be defined by a spherical or semi-spherical region centered at or near a specific point in space defined by a user. For example, the motion detection area may be dynamically configured and updated by a user, and may define custom three-dimensional areas in space surrounding robotic arm 701.

Sensors 704 may, for example, provide signals to one or more software systems within the laboratory environment in order to prevent robotic arm 701 from moving into specific areas within the laboratory environment. In one example, sensors 704 may be configured to detect movements associated with a user or other object within a specified motion detection area near robotic arm 701. If sensors 704 detect such motions, sensors 704 may send one or more alarm signals to software systems associated with robotic arm 701 in order to cease all movements of robotic arm 701. Sensors 704 may be configured to, for example, send signals to software systems associated with robotic arm 701 in order to resume movements of robotic 701 upon the sensors 704 detecting that any such user, object, or other event causing the alarm signals is no longer within the motion detection area. In another embodiment, sensors 704 and robotic arm 701 may remain disabled after the alarm signal until a predefined user restart process is initiated and completed. Upon completion of such user restart process, the robotic arm 701 and sensors 704 may, for example, resume normal operations.

In another embodiment, robotic system 700 includes an additional liquid handling apparatus 706 having a robotics unit configured for automated DNA extraction. Liquid handling apparatus 706 may be configured to handle multiple tube sizes and/or multiple sample types. For example, liquid handling apparatus 706 may be configured to handle either a 4 mm tube size or a 6 mm tube size. In another example, liquid handling apparatus 706 may be configured to handle either a blood sample or a saliva sample. In another embodiment, robotic system 700 includes a robotic refrigerator 707, which may be configured to store and retrieve sample plates of one or more different sizes. Robotic refrigerator 707 may be further configured, for example, to allow for human override to permit manual access to the contents within robotic refrigerator 707.

Figure 8:
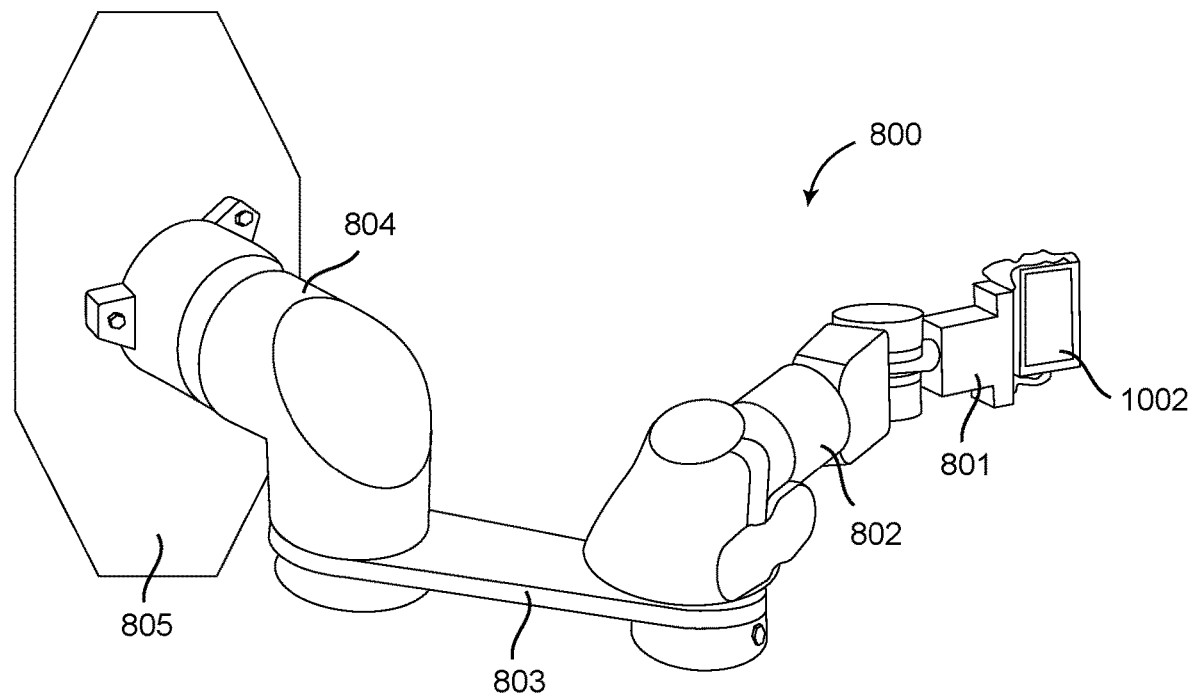
FIG. 8 illustrates an angled schematic view of a robotic arm.

FIG. 8 illustrates an angled view of a robotic arm 800, for example, a robotic arm such as robotic arm 701 in FIG. 7. As depicted in FIG. 8, robotic arm 800 includes a sample handling portion 801, a first solid section 802, a second solid section 803, a third solid section 804, and a robotic arm base 805. In one embodiment, sample handling portion 801 is connected to the first solid section 802. In another embodiment, first solid section 802 is connected at one end to sample handling portion 801, and is connected at another end to second solid section 803. In yet another embodiment, second solid section 803 is connected at one end to first solid section 802, and is connected at another end to third solid section 804. In yet another embodiment, third solid section 804 is connected at one end to second solid section 803, and is connected at another end to robotic arm base 805. As shown in FIG. 8, sample handling portion 801 is preferably adapted or configured to grip, hold or transport microplate 1002.

According to alternative embodiments, sample handling portion 801 is preferably adapted or configured to grip, hold or transport lid 1003 removed from a microplate. According to alternative embodiments, the sample handling portion 801 is adapted or configured to grip the microplate, preferably grip the "skirt" of the microplate ("shirt" is the larger footprint portion at the bottom of a microplate, and is usually 3-4 mm high and forms the base of the microplate) since if the microplate has a pin lid on it overhanging the top edge of the microplate, the sides of the microplate where the gripper would preferably grab are covered by the pin lid, so the microplate is preferably instead grabbed by the skirt.

Another aspect of the invention relates to devices adapted and/or configured for removing the lid or cover from a microplate or other laboratory plate containing one or more samples during a laboratory or manufacturing process. Preferably, the lid or cover has an overhang over the upper edges of the microplate.

Figure 9:
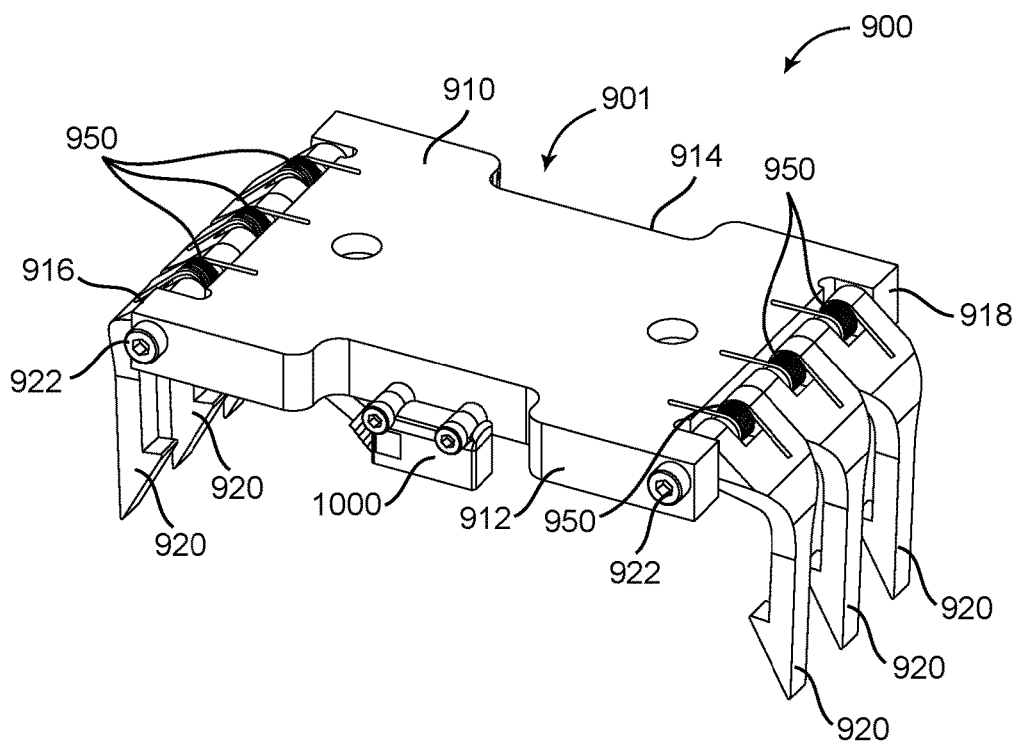
FIG. 9 illustrates a front corner elevation schematic view of a device according to one embodiment of the invention.
Figure 10:
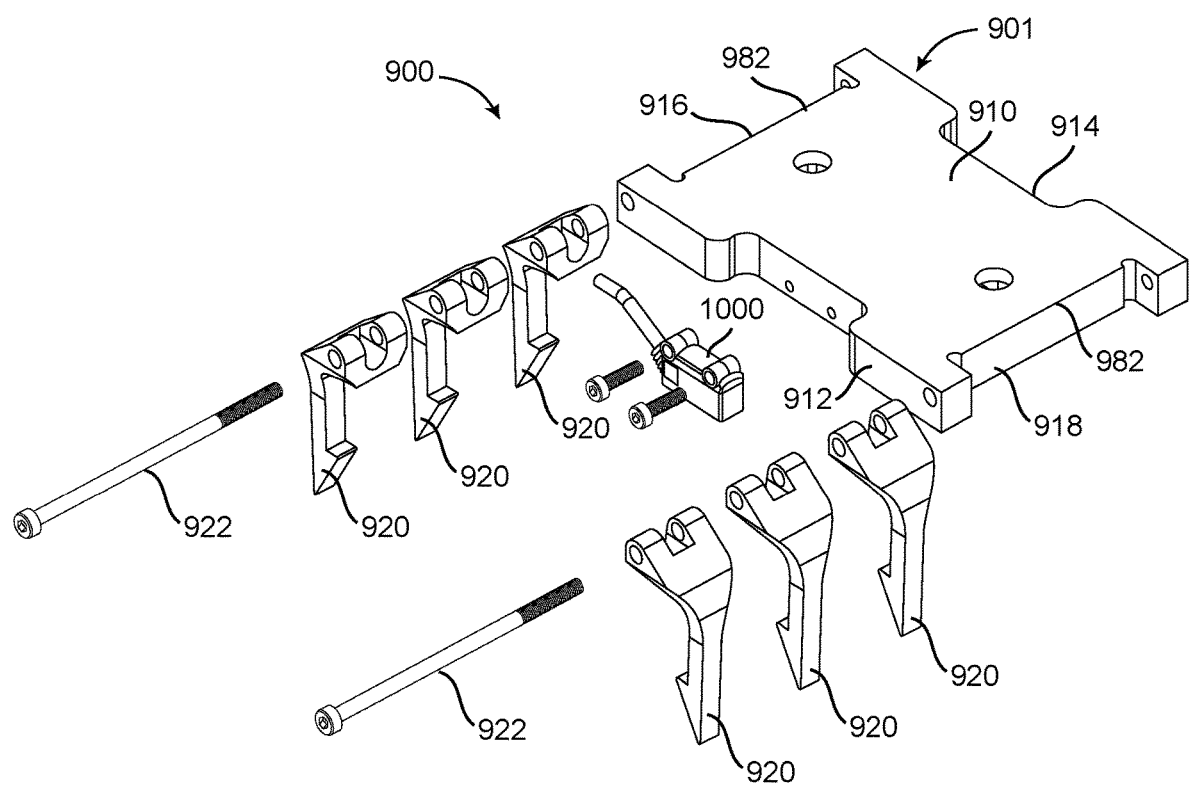
FIG. 10 illustrates an exploded schematic front corner elevation view of the device of FIG. 9 (without springs).
Figure 11:
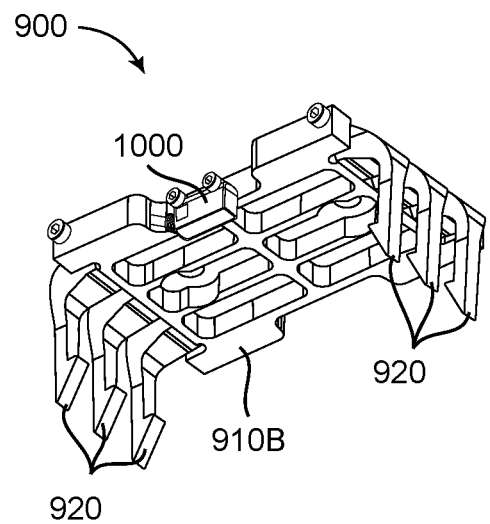
FIG. 11 illustrates a bottom front corner schematic view of the device of FIG. 9.
Figure 12:
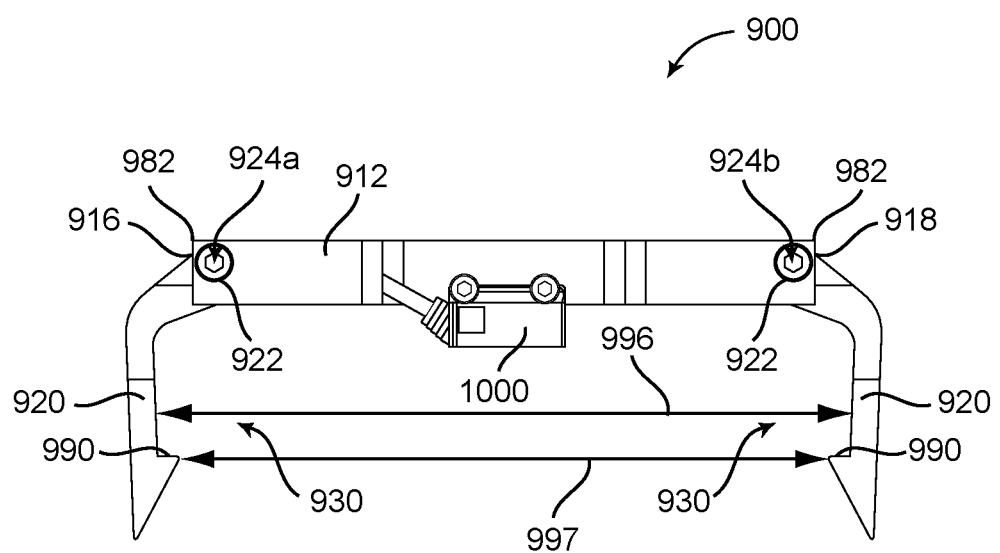
FIG. 12 illustrates a front schematic view of the device of FIG. 9.

Referring to FIG. 9, one embodiment of the invention relates to a device (900) for handling laboratory microplates comprising:

(a) a base platform (901) having (i) a length extending along a first direction and a width perpendicular to the length, (ii) a first side (916) along the first direction and a second side (918) along the first direction and opposite the first side (916), (iii) a front side (912) across the first direction and an opposite back side (914) across the first direction, (iv) a top surface (910), and (v) a bottom surface (910B); and (b) at least one pair of opposing gripping members (920) including one or more gripping members (920) pivotally attached to the first side and one or more gripping members (920) pivotally attached to the second side, wherein the gripping members extend down from the base and include a gripping tip disposed at the end of the gripping member.

Preferably, the device comprises at least two pairs of the opposing gripping members (920), more preferably at least three pairs of the opposing gripping members.

According to one alternative embodiment, the device comprises a single pair of the opposing gripping members (920), wherein the end of each gripping member (920) includes a wide stabilizing gripping tip, preferably the wide stabilizing gripping tips having a length corresponding to at least 30% of the length of the side of the lid being gripped, preferably at least 50% of the length of the side of the lid being gripped, more preferably at least 75% of the length of the side of the lid being gripped.

According to another embodiment, the device (900) comprises two or more gripping members (920) on three (3) sides of the base platform (901), preferably the device (900) comprises two or more gripping members (920) on four (4) sides (e.g., side (916), side (918), front (912) and back (914)). According to another embodiment, the device (900) comprises three or more gripping members (920) on three (3) sides of the base platform (901), preferably the device (900) comprises three or more gripping members (920) on four (4) sides (e.g., side (916), side (918), front (912) and back (914)).

According to one preferred embodiment, the device (900) further comprises a least one proximity sensor (1000) attached to the device configured to detect the proximity of the sensor to plates below the base. Preferably, proximity sensor (1000) detects the distance between bottom surface (910B) of base (901) and/or the gripping members (920) relative to the lid or microplate. Preferably, proximity sensor (1000) is attached to the side or bottom of base (901).

Preferably, the gripping members each include a gripping arm configured to be pivotable relative to the base. That is, the gripping members can swing inwardly and/or outwardly relative to the base.

Preferably, the gripping members are adapted and/or configured to lift a lid or cover off of a microplate such has a PCR plate, multi-well plate, or other plates used in laboratories.

According to one embodiment, the device includes at least one spring for the gripping members.

FIG. 9 shows a spring (950) in the pivot joint of each gripping member (920).

According to preferred embodiment, the device comprises at least one spring (950) urging at least one gripping member to a first closed or resting or default position.

Preferably, the at least one spring (950) is a torsion spring. Preferably, the at least one spring (950) is located where the gripping member is pivotally attached to the base (e.g., shoulder joint).

According to an alternative embodiment, the device comprises at least one spring (950) urging at least one gripping member to a second open position. Alternatively, the device comprises at least one actuator urging at least one gripping member to said first closed position.

Figure 13:
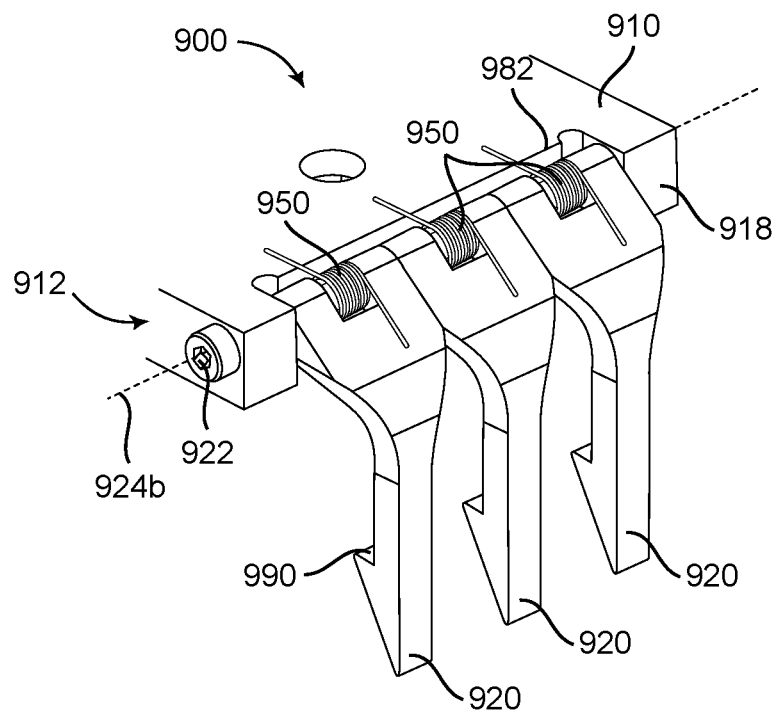
FIG. 13 illustrates a top front corner schematic view of the gripping member assembly of a device according to the device of FIG. 9.

FIG. 13 shows spring (950) as a torsion spring position around pin (922) at the pivot location for each gripping member (920). Specifically, the torsion spring has a center opening that allows pin (922) to pass thru thereby securing spring (950) within the pivot joint as shown in FIG. 13. Preferably, the center of pin (922), the center of the opening of torsion spring (950) are aligned with pivoting axis 924*b* as shown in FIG. 13.

According to preferred embodiment, each gripping member (920) has a corresponding spring (950), preferably located or positioned within the shoulder joint as shown in FIG. 13.

According to alternative embodiments, a single spring is used for each row of gripping members (920), for example, wherein the pin bores of the gripping members (920) are configured to form a locking arrangement with pin (922) and spring (950) is adapted or configured to act on the pin (922) or a single gripping member (950) for each row so that the force of the single spring is applied, directly or indirectly, to each gripping member (950).

According to preferred embodiments, the gripping members are movable from a first closed position to a second opened position.

Preferably, the gripping members are also movable to an intermediate position between the first closed position to a second opened position.

Preferably, the gripping members are also movable to an expanded position greater than second opened position.

According to one preferred embodiment, the gripping members can pivot to three different operational positions (1) a resting or default position, (2) an expanded or flexed position and (3) a gripping position. Preferably, the distance between the gripping members at the gripping position is between the distances of (1) and (2).

Preferably, the gripping members are configured to be in the first resting or default closed position but can be flexed open to the second expanded open position when pushed onto lid of the plate.

Preferably, the gripping members configured to default to the first closed position, can be flexed to an expanded open position when pushed onto the plate and then move to intermediate gripping position to clasp a lid from the plate.

Figure 20:
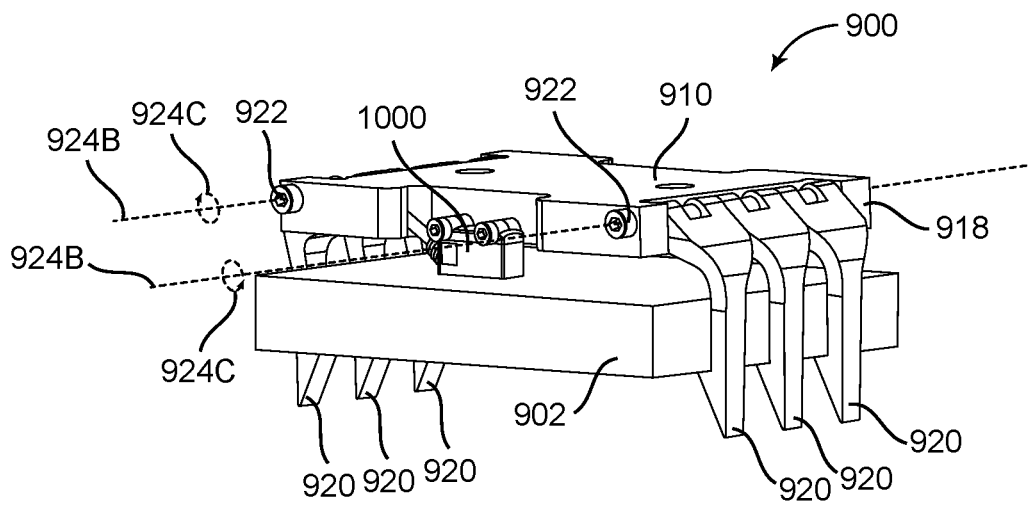
FIG. 20 illustrates a front corner elevation view of the device of FIG. 9 holding a lid of a microplate according to one embodiment of the invention.

FIG. 20 shows device (900) holding lid (902) with gripping members (920) in a gripping position clasping the edges of lid (902). As can be seen, gripping members (920) are configured to flex to an open position along axis 924B rotating along rotation 924C to allow gripping members (920) to expand to accommodate lid (902) until the gripping hooks clasp the underside edge of the lid (902) moving the gripping members (920) to a gripping position.

Figure 21:
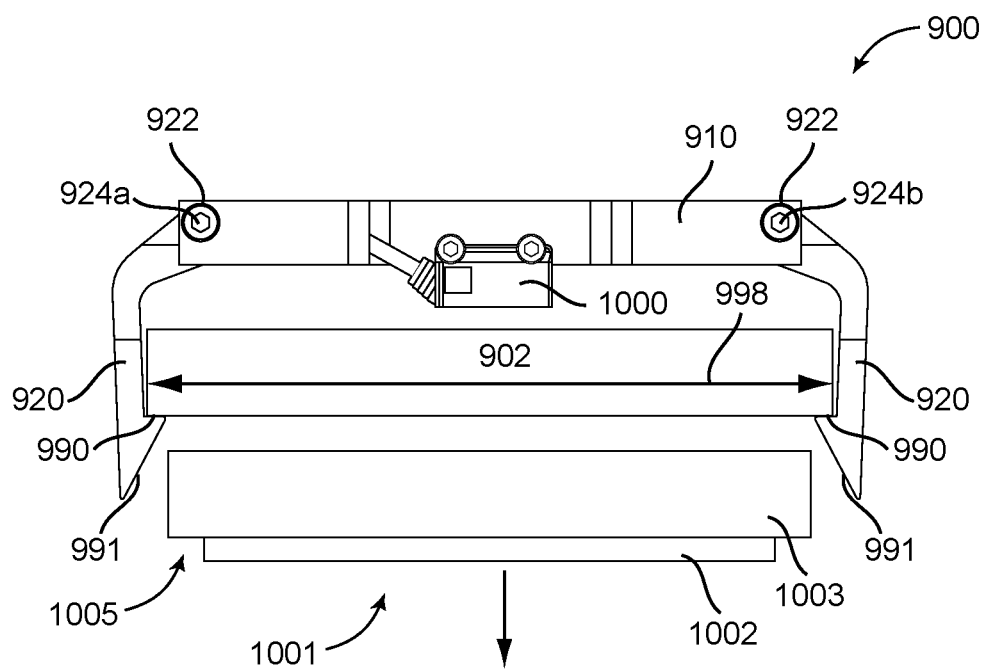
FIG. 21 illustrates a front view of the device of FIG. 9 holding a lid removed from a microplate (not shown) with a second microplate with a lid shown beneath according to one embodiment of the invention.

FIG. 21 shows device (900) with gripping members (920) holding lid (902) on gripping planar surfaces (990) and a microplate unit (1001) comprising microplate (1002) with lid (1003) aligned beneath the device (900). As can be seen, according to preferred embodiments, as the device (900) and microplate unit (1001) are brought together, guiding surfaces (991) have initial contact with the top edge of lid (1003) resulting in gripping members (920) expanding open as the device (900) and microplate unit (1001) are moved closer, until the gripping planar surface (990) reach a gripping point below the bottom corner edge of the lid (902) thereby allowing gripping members (920) to move to a gripping position with gripping planar surfaces (990) gripping the underside edge of the lid (902). Advantageously, this allows the gripping members (920) to remove lid (902) without contacting the underlying microplate (1002).

Advantageously, preferred methods according to the invention provide the advantages of not vibrating or otherwise disturbing the microplate, which could cause splashing (i.e. well-to-well contamination) and/or otherwise disturb the liquid in the wells so that the plate would need to be centrifuged again to collect all of the liquid at the bottom and/or remove bubbles.

According to alternative preferred embodiments, gripping members (920) do not require guiding surface (991) but instead use actuators (e.g., motors, solenoids, etc.) to move the hooks to operational positions (e.g., open and close positions).

Figure 22:
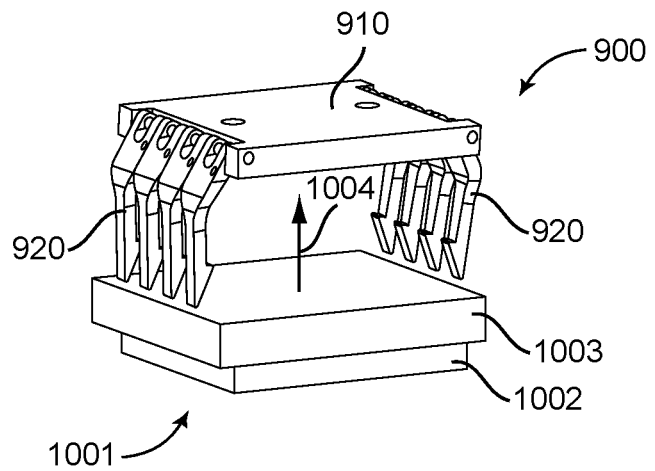
FIG. 22 illustrates a front corner elevation view of a device positioned above a microplate with lid according to one embodiment of the invention.
Figure 23:
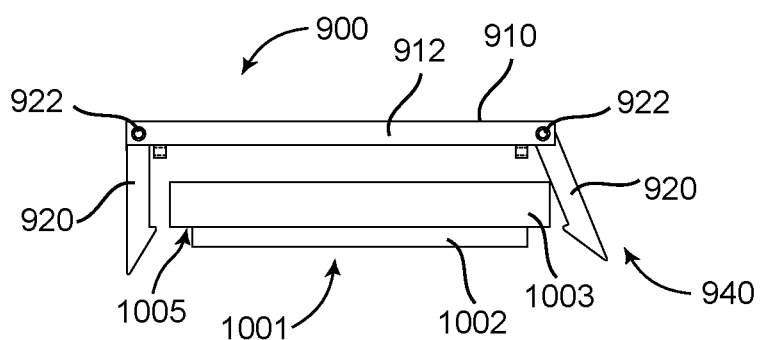
FIG. 23 illustrates a front view of a device close to being positioned to remove a lid from microplate according to one embodiment of the invention.

FIG. 22 shows a device (900) having gripping members (920) in a default or resting closed position while the device (900) is positioned above a microplate unit (1001) comprising microplate 1002 and lid (1003), while FIG. 23 shows a device not 100% aligned on microplate unit (1001) resulting in right side of gripping members (920) flexed to an overly expanded open position when pressed against lid (1003), while left side of gripping members (920) remain in resting or default position.

According to one embodiment, the gripping members are curved downward from the base.

According to another embodiment, the gripping members are curved towards opposing gripping members.

According to another embodiment, the gripping members are curved inwardly beneath the base. According to an alternative embodiment, the gripping members are straight as shown in FIG. 23.

According to one embodiment, each gripping member has a pivot point at a shoulder joint connecting the gripping member to the base.

According to preferred embodiments, the device further comprises a spring within the shoulder joint.

Preferably, the gripping member is wider at the shoulder joint and tapers along a first portion of the gripping member.

Preferably, the gripping end is spaced from the pivot point as seen, for example, in FIG. 9.

Preferably, gripping members are bowed downward from the base.

Preferably, the pairs of gripping members form a spider-like configuration with the base with gripping members extending therefrom.

The gripping members according to the invention preferably left a lid, cover or other component off of a microplate without lifting or contacting the microplate. This allows a lid to be removed without disturbing the contents within the wells of a multi-well plate, for example. Preferably, the gripping members have ends configured or adapted to lift a lid. The device of the invention can be advantageously used in laboratory or manufacturing processes involving the use of microplates with lids.

According to one embodiment, each gripping tip comprises a gripping hook (990) at the end of each member.

According to another embodiment, each gripping member comprises a hook-shaped end extremity configured to engage the underside edge of a plate lid without engaging the plate to allow for lid removal. Preferably, the gripping hook includes a gripping surface (990) configured to hold and left a lid. Preferably, the gripping surface (990) is a planar surface. According to one preferred embodiment, the gripping surface (990) is a planar surface parallel to the base.

According to preferred embodiments, the hook-shaped end extremity includes a guiding surface (991) starting from the tip of the member and tapering inwardly forming an edge with the gripping surface (990).

As discussed above, the gripping members are preferably attached to a base or carrier. Preferably, the base or carrier is attached to a robotic arm such as the robotic arm in FIG. 8. Alternatively, the device is mounted on a platform and a robotic arm delivers microplates to the stationary device.

According to one embodiment, the gripping members are hingably mounted to the first side or the second side of the base.

Preferably, referring to FIGS. 15-19, each gripping member (920) is an elongated lever or latch (970) having formed on a top end thereof a pair of parallel spaced fingers (984) adapted or configured to be pivotally mounted to the base by at least one pin (922) extending through accommodating bores (982) formed through the parallel spaced fingers (984) and accommodating bores (984) through flanges on the first side and the second side of the top end thereby attaching gripping member (920) to a base.

Preferably, the parallel, spaced fingers (984) define a recess (983) there between. Preferably the recess accommodates a spring (950) urging the gripping member to a resting or default position.

According to alternative embodiments, an actuator (e.g., motor, solenoid) is used instead of the spring in order to drive the gripping members' positions.

FIGS. 15-19 shows gripping planar surface (990) for clasping the underside edge of the lids (or other covers) and also guiding surface (991) that first contacts the top edge of the lid and expands or flexes the gripping member (920) to an expanded open position until the gripping planar surface (990) reaches the point below the underside edge of the lid and engages under the lid closing the gripping members (920) into a gripping position (see FIG. 20).

Preferably, the gripping members (920) comprise (i) an elongated portion (992) having a planar front surface (972) and a back surface comprising the tapering guiding surface (991) leading to gripping planar surface (990), (ii) a curved portion (973) and (iii) top portion including a top surface (970) and parallel, spaced fingers (984) (see FIGS. 15-19). Preferably, the top back of gripping members (920) facing the base (901) comprises a planar surface (980) and the top side comprise side surfaces (971) with the accommodating bores (982).

According to preferred embodiments, the gripping members are attached to the base by two or more pins around which the gripping members pivot. Preferably, the gripping members pivot around a pivoting axis (for example, axis 924*a* allowing pivot rotation 924C as shown in FIG. 20).

According to preferred embodiments, each gripping member on each side is pivotally attached to the base via a pin (922).

According to preferred embodiments, the one or more gripping members (920) attached to the first side are pivotally attached with a first side pin (922) and the one or more gripping members (920) attached to the second side are pivotally attached with a second side pin (922).

The base or carrier carries or holds the gripping members. Preferably, the base is configured or adapted to be attached to a robotic arm such as the robotic arm shown in FIG. 8. Alternatively, the base is stationary and the microplates are positioned below the device and moved up to engage the gripping members to remove the lid.

According to one embodiment, the base has a rectangular or square form.

According to preferred embodiments, the first side and the second side of the base include side cut outs (982) on each side configured for attaching the gripping members.

Preferably, the first side and the second side include side cut outs on each side forming flanges (916 and 918) configured for attaching the gripping members.

Preferably, the flanges (916 and 918) attach the gripping members using a pin. As seen in FIG. 9, each of flanges (916 and 918) and the tops of each gripping member includes aligned accommodating bores for the pin (922) to thread through thereby attaching the gripping members (920) to the base (901).

Preferably, the front side (912) includes a cut out to accommodate the sensor (1000) (see FIG. 9).

Figure 14A:
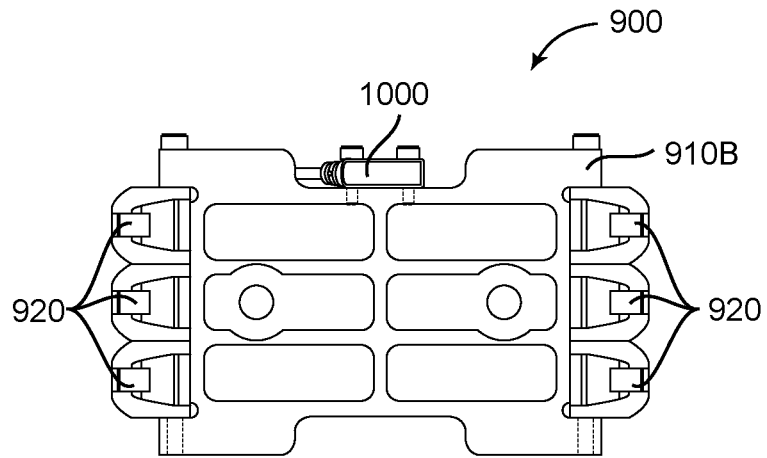
FIG. 14A illustrates a schematic bottom view of the device of FIG. 9.
Figure 14B:
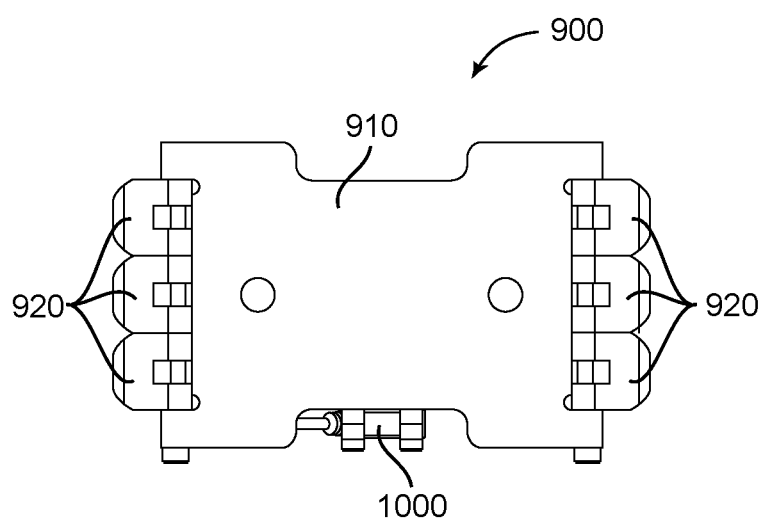
FIG. 14B illustrates a schematic top view of the device of FIG. 9 (without springs).
Figure 15:
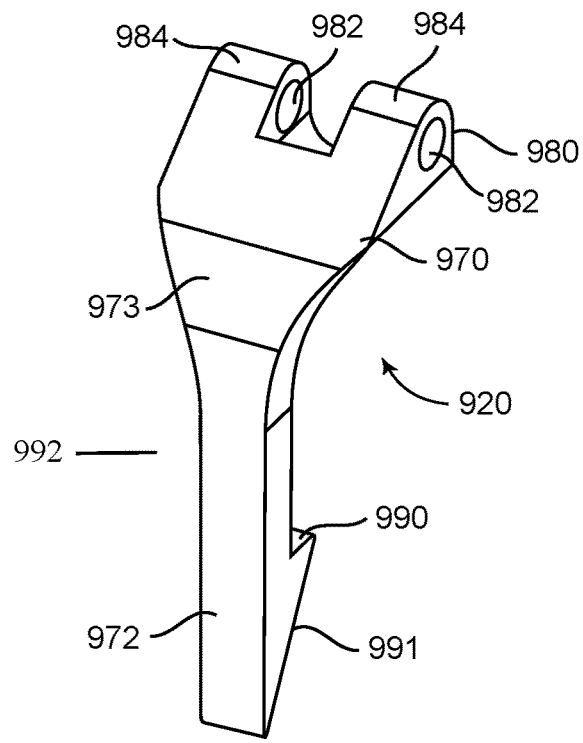
FIG. 15 illustrates a front corner schematic view of a gripping member according to one embodiment of the invention.
Figure 16:
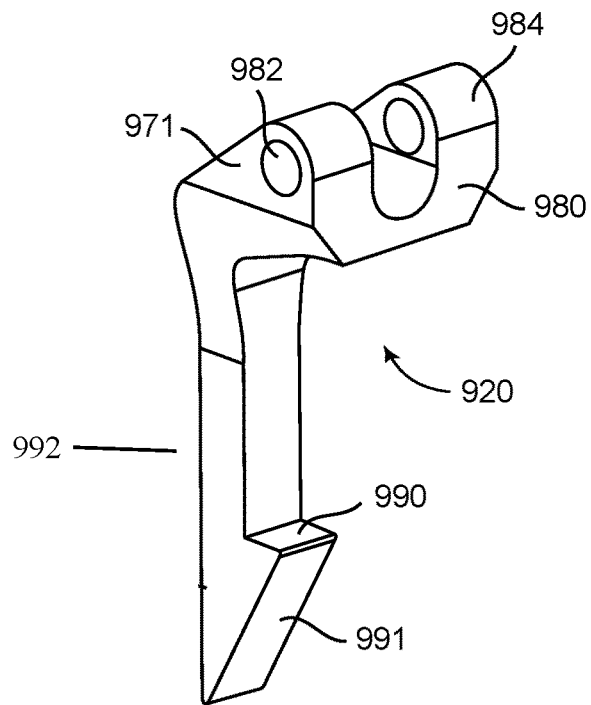
FIG. 16 a back corner schematic view of the gripping member of FIG. 15.

FIG. 14A illustrates a bottom view of the base (901) showing six rounded rectangular shapes and two circles, which are thru holes for mounting the base to a fixed object or robotic arm with two screws. The six rounded rectangular shapes are cutouts that allow the mounting screws to sit inside the base. Preferably, there are six cutouts instead of one big one to leave some material in order to keep the part stiff and reduce flexing. FIG. 14B is a top view of the device (900) showing two holes to accommodate screws or other attachment mechanisms to attach the device to a robotic arm or platform.

The device according to the invention can be made from a variety of materials.

According to preferred embodiments, the components of the device are made of plastic, metal and/or composite materials.

Preferably, the base is molded or machined in a unitary part from material such as acetel, nylon, or any suitable plastic.

Preferably, each gripping member is molded or machined in a unitary part from material such as acetel, nylon, or any suitable plastic.

Preferably, the gripping members or portions thereof comprise rubber materials, preferably at the gripping ends of the gripping members.

According to preferred embodiments, the device further comprises a reader to read or detect information on the plates. For example, a reader to read bar codes or other identifications on the microplate or lid.

The device of the invention can be used with a variety of laboratory or manufacturing plates. Preferably, microplate comprising a lid or cover.

Multi-well plate formats suitable for use with the invention include those found on 96-well plates (12×8 array of wells), 384-well plates (24×16 array of wells) and 1536-well plate (48/32 array of well). The Society for Biomolecular Screening has published recommended microplate specifications for a variety of plate formats (see, https://www.slas.org/SLAS/assets/File/ANSI_SLAS_1-2004_FootprintDimensions.pdf), the recommended specifications hereby incorporated by reference.

According to preferred embodiments of the invention, the device and/or gripping members are configured to remove lids or covers from microplates (e.g., polymerase chain reaction (PCR) plates).

According to preferred embodiments of the invention, the lid overhangs the edges of the plate. Preferably, the overhang is between 0.1 mm and 5 mm. More preferably, the overhang is greater than 1 mm.

Another aspect of the invention relates to methods of using the above-described devices to remove lids from microplates.

One embodiment of the invention relates to a method of removing a lid from a microplate comprising:
  (a) placing a microplate having a lid under the bottom surface of the device of claim 1, wherein the lid is facing the bottom surface and overhangs the microplate providing a lid gripping edge around at least a portion of the perimeter of the microplate;
  (b) pressing the lid into the device thereby flexing the gripping members to expand and clasp the lid by the lid gripping edge; and
  (c) removing the lid from the microplate.

According to one embodiment, the gripping member returns to the second position.

According to another embodiment, the lid is removed from the plate by pushing the device onto the lid but not the underlying plate thereby engaging the gripping members or pushing the plate with lid up into the device thereby engaging the gripping members.

Preferably, the gripping tips slide over the edge of the lid.

Preferably, the gripping tips slides over the edge of the lid separating the opposing gripping members until the hook engages under the lid.

Preferably, the gripping members are flexed apart to engage the lid.

According to preferred embodiments, the gripping members (920) each comprise a gripping hook (990) that clasps onto the lid gripping edge (1005) allowing the lid to be lifted and removed from the microplate (1002).

Preferably, the gripping members comprise a tapering tip (991) configured to allow the gripping members to expand apart to envelop the lid as the lid is pushed into the gripping members and subsequently close to a gripping position to clasp the lid with the gripping hook.

According to preferred embodiments, the method further comprises removing the microplate, after the lid is removed from the microplate, from under the device. That is, the device lifts the lid off the microplate and the microplate is moved to the next station in the process. The method also preferably includes the device depositing the lid in another location (e.g., on a rack, storage, stack, disposal, etc.). Preferably, after the lid is disposed of, the method further comprises placing a second microplate having a lid under the bottom surface of the device and repeating steps (b) and (c).

Preferred methods of the invention including receiving a sample microplate according to the process flow shown in FIG. 6, for example, and using the device of the invention to remove the lid from the microplate. For example, the destination 606 in FIG. 6, for example, is a location under the device to allow the lid of the microplate to be removed and the microplate is subsequently transferred to a next destination. According to further preferred embodiments, a robotic arm, such as the robotic arm shown in FIG. 8, is employed to transport the microplate.

According to one embodiment, the microplate with lid is pushed up into the device. According to alternative embodiments, the device is pushed onto microplate with lid from above.

Preferably, the gripping members do not contact the microplate and only contacts the lid. That is, the gripping members are configured and/or adapted to engage the lid by engaging only the overhang thereby removing the lid without contacting the microplate.

Preferably, the microplate and lid are rectangular and the lid gripping edge is along at least two parallel sides.

Preferably, the microplate and lid are rectangular and the lid gripping edge is along at least a portion of all four sides.

Preferably, the microplate and lid are rectangular and the lid gripping edge is along all four sides.

According to the invention, the gripping members flex or pivot relative to the base to grip the lid or microplate.

According to one embodiment, the gripping members flex open 2 mm and then close back into a gripping position after locking onto the lid.

According to preferred embodiments, at their resting/first position, the gripping members are only slightly more closed than when they are gripping the lid (0-2 mm difference between the two positions), and while the lid is being pushed up into the gripping members, the gripping member preferably move or are expanded open between 5-10 mm to accommodate the lid (see FIGS. 21-23).

Preferably, the distance between the gripping member in their first/resting position when no lid is held is between 120-140 mm (preferably 129 mm), while the corresponding dimension on the lid is 128 mm. Preferably the corresponding dimension of the microplate skirt is also 128 mm but is only 3-4 mm high and forms the microplate base or footprint. Above the skirt, the plate gets smaller and also is drafted/tapered, so the plate gets smaller from the skirt towards the top of the microplate. According to preferred embodiments, this taper and reduction in size of the microplate is what causes the pin lid to hang over, allowing the lid to be more easily gripped.

According to preferred embodiments, the method can be performed at least three times per minute. The number of times per minute is mainly dependent on the setup and speed of the robotic arm that uses the device and other factors.

One alternative aspect of the invention relates to methods comprising applying a lid to a microplate using the devices of the invention. Namely, the reverse of the methods described above whereby a lid is placed onto a microplate. Preferably, the gripping members further comprise additional hooks to push the lid onto the microplate.

The devices according to the invention may be used in various laboratory or manufacturing (e.g., biotech or pharmaceutical manufacturing) processes involving microplates having one or more, preferably 96 or more individual samples.

As used herein, the terminology as used throughout the description of the invention is for the purpose of describing particular embodiments only. Such terminology does not limit the scope of the invention in any way. For example, singular forms of "a," "an" and "the" are intended to include plural forms unless indicated otherwise. Furthermore, terms such as "comprises" or "comprising" specify the presence of indicated features, components, steps, etc., but do not preclude the presence or addition of one or more other features, components, steps, etc. The description may also include the term "in," which may include "in" and "on" unless clearly indicated otherwise. Furthermore, usage of the term "or" includes both conjunctive and disjunctive meanings, unless clearly indicated otherwise. That is, unless expressly stated otherwise, the term "or" may include "and/or."

The scope of the present inventions (including devices, systems and methods, etc.) may include both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

It will be further understood that various modifications to the invention may be made by one skilled in the art without departing from the spirit and scope of the invention as defined in the claims. For example, numerous changes, substitutions, and variations with respect to the systems and methods as described may occur. One of ordinary skill in the art will understand that various alternative embodiments may be employed to practice the invention, and that any feature may be combined with any other feature, whether such features are preferred or not.

The invention claimed is:

1. A device comprising:
   (a) a base platform having (i) a length extending along a first direction and a width perpendicular to said length, (ii) a first side along said first direction and a second side along said first direction and opposite said first side, (iii) a front side across said first direction and an opposite back side across said first direction, (iv) a top surface, and (v) a bottom surface, which is opposite to the top surface, wherein no portion of the base platform is above the top surface or below the bottom surface; and wherein the base platform is configured or adapted to be attached to a robotic arm; and
   (b) at least two first gripping members each independently pivotally attached at a first gripping member proximal end to said first side of said base platform and at least two second gripping members each independently pivotally attached at a second gripping member proximal end to said second side of said base platform, wherein each of the at least two first gripping members forms a pair of opposing gripping members with an opposing gripping member of the at least two second gripping members so that the device comprises at least two pairs of the opposing gripping members, wherein each of said at least two first gripping members and said at least two second gripping members includes a gripping tip disposed at a distal end of a respective gripping member and each of said at least two first gripping members and said at least two second gripping members independently extends down from said base platform so that the gripping tip is below the bottom surface of the base platform.

2. The device of claim 1, further comprising at least one proximity sensor attached to said device configured to detect the proximity of a laboratory plate below said base platform.

3. The device of claim 1, wherein each of said at least two first gripping members and each of said at least two second gripping members is configured to independently move from a first closed position to a second opened position, wherein the first closed position is a resting or default position and wherein each gripping tip comprises a hook-shaped extremity configured to engage an underside edge of a lid of a laboratory plate so that the lid is held underneath the bottom surface of the base platform.

4. The device of claim 1, wherein each of said at least two first gripping members and each of said at least two second gripping members includes a gripping hook comprising a planar gripping surface configured to lift a lid of a laboratory plate and are configured to independently pivot relative to said base platform, wherein the planar gripping surface of each of said at least two first gripping members and each of said at least two second gripping members is parallel to the bottom surface of the base platform.

5. The device of claim 1, wherein said gripping members are configured to lift a lid off of a laboratory plate.

6. The device of claim 3, wherein said device comprises at least one spring for each gripping member configured to independently urge the respective gripping member to said first closed position.

7. The device of claim 6, wherein said at least one spring is a torsion spring.

8. The device of claim 6, wherein said at least one spring is located where said gripping member is independently pivotally attached to said base platform and each gripping member comprises an elongated portion extending from the base platform below the bottom surface of the base platform.

9. The device of claim 3, wherein each of said gripping members is independently configured to be in said first closed position but can be reversibly flexed open to said second open position when said gripping members are pushed onto the lid of the laboratory plate positioned below the bottom surface of the base platform.

10. The device of claim 1, wherein each of said gripping members is independently configured to default to a first closed position, can be reversibly flexed to a second open position when said gripping members are pushed onto a laboratory plate positioned below the bottom surface of the base platform and then move to an intermediate gripping position to clasp a lid from said laboratory plate.

11. The device of claim 1, wherein each of said gripping members is curved towards a respective opposing gripping member.

12. The device of claim 1, wherein each of said gripping members is curved inwardly beneath said base platform.

13. The device of claim 1, wherein each gripping member has an independent pivot point at a shoulder joint connecting the proximal end of the gripping member to said base platform.

14. The device of claim 1, wherein the at least two first gripping members comprise at least three first gripping members each independently pivotally attached to said first side of said base platform and the at least two second gripping members comprise at least three second gripping members each independently pivotally attached to said second side of said base platform, so that the device comprises at least three pairs of opposing gripping members.

15. A device comprising:
(a) a base platform having a first side and a second side opposite said first side; and
(b) at least two first gripping members each independently pivotally attached at a first gripping member proximal end to said first side of said base platform and at least two second gripping members each independently pivotally attached at a second gripping member proximal end to said second side of said base platform, wherein each of the at least two first gripping members forms a pair of opposing gripping members with an opposing gripping member of the at least two second gripping members so that the device comprises at least two pairs of opposing gripping members, wherein each of said at least two first gripping members and said at least two second gripping members includes a gripping tip disposed at a distal end of a respective gripping member and each of said at least two first gripping members and said at least two second gripping members independently extends down from said base platform so that the gripping tip is below any portion of the base platform,
wherein each pair of opposing gripping members are configured to independently move from a first closed position to a second opened position,
wherein each gripping member comprises the respective proximal end pivotally attached to the base platform, an elongated portion extending down from the base platform to the gripping tip disposed at the distal end of the gripping member, and a curved portion connecting the proximal end to the elongated portion,
wherein said device further comprises at least one spring for each gripping member configured to urge the respective gripping member to said first closed position; and wherein the base platform has a top surface and a bottom surface, which is opposite to the top surface, no portion of the base platform is above the top surface or below the bottom surface.

16. The device of claim 15, wherein each gripping tip is configured to independently engage an underside edge of a lid of a laboratory plate positioned underneath the base platform to allow for removal of the lid from the laboratory plate.

17. The device of claim 15, wherein each gripping tip comprises a hook and is configured to slide over an edge of a lid of a laboratory plate positioned underneath the base platform thereby independently separating for each of the at least two pairs of the opposing gripping members, a first gripping member of the at least two first gripping member and an opposing gripping member of the at least two second gripping members until the hook engages under the lid.

18. A device for removing lids from laboratory plates, the device comprising:
(a) a base platform having a first side and a second side opposite said first side; and
(b) at least two first gripping members each independently pivotally attached at a first gripping member proximal end to said first side of said base platform and at least two second gripping members each independently pivotally attached at a second gripping member proximal end to said second side of said base platform, wherein each of the at least two first gripping members forms a pair of opposing gripping members with an opposing gripping member of the at least two second gripping members, wherein each of said at least two first gripping members and said at least two second gripping members includes a gripping tip disposed at a distal end of a respective gripping member and each of said at least two first gripping members and said at least two second gripping members independently extends down from said base platform so that the gripping tip is below any portion of the base platform,
wherein each pair of opposing gripping members are independently configured to default to a resting first closed position, can be reversibly flexed to an expanded second open position when pushed onto a laboratory plate having a lid when the laboratory plate is positioned underneath the base platform and then move to intermediate gripping position to clasp the lid from the laboratory plate, wherein the intermediate gripping position is between the resting first closed position and the expanded second open position;
wherein each gripping member has an independent pivot point at a shoulder joint connecting the gripping member to said base platform and configured to allow the gripping member to independently swing inwardly and outwardly relative to the base platform, and
wherein the base platform has a top surface and a bottom surface, which is opposite to the top surface, no portion of the base platform is above the top surface or below the bottom surface.

19. The device of claim 18, wherein said device further comprises at least one torsion spring within each shoulder joint of each gripping member.

20. The device of claim 18, wherein each gripping tip comprises a guiding surface configured to have initial contact with a top edge of the lid of the laboratory plate and configured to expand the gripping members into the expanded second open position and each gripping tip further comprise a gripping surface configured to lift the lid and hold the lid underneath the base platform.

21. The device of claim 1, wherein each of the first side and the second side of the base platform comprises (a) a first extended portion at the front side of the base platform, (b) a second extended portion at the back side of the base platform; and (c) a recess portion between the first extended portion and the second extended portion, the recess portion of the first side of the base platform is configured to accommodate the at least two first gripping members, the recess portion of the second side of the based platform is configured to accommodate the at least two second gripping members, each of the first extended portion and the second extended portion of each of the first side and the second side has an opening in a direction between the front side and the back side of the base platform, wherein the device further comprises a first pin at the first side of the base platform and a second pin at the second side of the base platform, the first pin extends through the opening of the first extended portion at the first side of the base platform, the at least two first gripping members accommodated at the recess portion at the first side of the base platform and the opening of the second extended portion at the first side of the base platform, thereby the first pin provides a pivoting axis for the at least two first gripping members; the second pin extends through the opening of the first extended portion at the second side of the base platform, the at least two second gripping members accommodated at the recess portion at the second side of the base platform and the opening of the second extended portion at the second side of the base platform, thereby the second pin provides a pivoting axis for the at least two second gripping members.

22. The device of claim 7, wherein the torsion spring has a first terminal linear portion and a second terminal linear portion, the first terminal linear portion contacts the top surface of the base platform and the second terminal linear portion contacts a surface of the respective gripping member associated with the torsion spring.

\* \* \* \* \*